United States Patent
Usui

(10) Patent No.: US 10,210,136 B2
(45) Date of Patent: Feb. 19, 2019

(54) PARALLEL COMPUTER AND FFT OPERATION METHOD

(71) Applicant: FUJITSU LIMITED, Kawasaki-shi, Kanagawa (JP)

(72) Inventor: Tetsuzou Usui, Numazu (JP)

(73) Assignee: FUJITSU LIMITED, Kawasaki (JP)

(*) Notice: Subject to any disclaimer, the term of this patent is extended or adjusted under 35 U.S.C. 154(b) by 109 days.

(21) Appl. No.: 15/439,093

(22) Filed: Feb. 22, 2017

(65) Prior Publication Data

US 2017/0262410 A1    Sep. 14, 2017

(30) Foreign Application Priority Data

Mar. 14, 2016 (JP) ................... 2016-049137

(51) Int. Cl.
*G06F 17/14* (2006.01)
*H04L 29/08* (2006.01)

(52) U.S. Cl.
CPC ............ *G06F 17/142* (2013.01); *H04L 67/10* (2013.01)

(58) Field of Classification Search
CPC .............................. G06F 17/142; H04L 67/10
USPC .................................................. 708/400–409
See application file for complete search history.

(56) References Cited

U.S. PATENT DOCUMENTS

| | | |
|---|---|---|
| 5,751,616 A | 5/1998 | Hegland et al. |
| 2004/0019621 A1* | 1/2004 | Morikawa ............ G06F 9/3001 |
| | | 708/401 |
| 2004/0193841 A1 | 9/2004 | Nakanishi |
| 2004/0236810 A1 | 11/2004 | Yamamoto et al. |
| 2009/0141309 A1* | 6/2009 | Lee ....................... H04N 1/0083 |
| | | 358/3.03 |
| 2010/0082668 A1* | 4/2010 | Hsueh ................. H04L 27/2614 |
| | | 707/770 |
| 2012/0233621 A1 | 9/2012 | Doi et al. |

FOREIGN PATENT DOCUMENTS

| | | |
|---|---|---|
| JP | H09-153029 A | 6/1997 |
| JP | 2000-200261 A | 7/2000 |
| JP | 2001-249917 A | 9/2001 |
| JP | 2004-302928 A | 10/2004 |
| JP | 2004-348493 A | 12/2004 |
| JP | 2005-189970 A | 7/2005 |
| JP | 2013-037723 A | 2/2013 |

OTHER PUBLICATIONS

M. Eleftheriou et al., "Scalable Framework for 3D FFTs on the Blue Gene/L Supercomputer: Implementation and Early Performance Measurements", IBM Journal of Research and Development, vol. 49, No. 2/3, pp. 457-464, Mar./May 2005 (Total 8 pages).

(Continued)

*Primary Examiner* — Tan V Mai

(74) *Attorney, Agent, or Firm* — Fujitsu Patent Center

(57) ABSTRACT

A storage unit includes first to third storage areas. An operation unit executes, while executing a first process to perform an FFT (Fast Fourier Transform) operation by using the first storage area, a second process to transmit a calculated FFT calculation result stored in the second storage area to other processes and to store an FFT operation result received from said other processes in the third storage area.

7 Claims, 37 Drawing Sheets

(56) References Cited

OTHER PUBLICATIONS

Maria Eleftheriou et al., "Performance Measurements of the 3D FFT on the Blue Gene/L Supercomputer", Euro-Par 2005, LNCS 3648, pp. 795-803, 2005, Parallel Processing, Springer-Verlag Berlin Heidelberg 2005 (Total 9 pages).
Roland Schulz, "3D FFT with 2D Decomposition", CS Project Report, Apr. 27, 2008 (Total 19 pages).
Ming Li et al., "2DECOMP&FFT—A Highly Scalable 2D Decomposition Library and FFT Interface", Cray User Group 2010 Proceedings pp. 1-13, Conference, 2010 (Total 13 pages).
Truong Vinh Truong Duy et al., "A Decomposition Method with Minimum Communication Amount for Parallelization of Multi-Dimensional FFTs", arXiv:1302.6189vI, [cs.NA] Feb. 6, 2013 (Total 24 pages).

* cited by examiner

EXAMPLE OF BIAXIAL DISTRIBUTION

EXAMPLE OF STREAMS

| STREAM R1 | TRANS-POSITION-IN | TRANS-MISSION | RECEP-TION | FFT | TRANS-MISSION | RECEP-TION | TRANS-POSITION-OUT |

| STREAM R2 | TRANS-POSITION-IN | TRANS-MISSION | RECEP-TION | FFT | TRANS-MISSION | RECEP-TION | TRANS-POSITION-OUT |

FIG. 18

| DIVISION METHODS FOR PERFORMING FFT OPERATION | DISTRIBUTION AXIS | PRESENCE OF OVERLAPPING OF OPERATION AND COMMUNICATION | WORK AREA SIZE | PRESENCE OF OR LEVEL OF CONSTRAINT ON ADJUSTMENT OF SECTION SIZE | ESTIMATE OF MESSAGE LENGTH WHEN NUMBER OF ALL PROCESSES = NP |
|---|---|---|---|---|---|
| GLOBAL ARRAY IS SIMPLY SEGMENTED | UNIAXIAL DISTRIBUTION | NO | INPUT ARRAY | NO SEGMENTATION | $(N^3)/(NP^2)$ |
| | BIAXIAL DISTRIBUTION | YES | FOUR SECTIONS | HIGH | $(N^3)/(NP^2)/NS$ |
| | | NO | INPUT ARRAY | NO SEGMENTATION | $(N^3)/NP/NP^{[1/2]}$ |
| | | YES | FOUR SECTIONS | HIGH | $(N^3)/NP/NP^{[1/2]}/NS$ |
| MULTIPLE FFT IS SEGMENTED INTO ARBITRARY SIZES AMONG PROCESSES | UNIAXIAL DISTRIBUTION | YES | THREE SECTIONS | LOW | $(N^3)/(NP^2)/NS$ |
| | BIAXIAL DISTRIBUTION | YES | THREE SECTIONS | LOW | $(N^3)/NP/NP^{[1/2]}/NS$ |
| | TRIAXIAL DISTRIBUTION | YES | THREE SECTIONS | LOW | $(N^3)/NP/NP^{[1/3]}/NS$ |

COMPARATIVE EXAMPLES

FIG. 27

EXAMPLE OF STREAMS IN FORWARD FFT

| STREAM R1a | TRANSPOSI-TION-IN | TRANS-MISSION | RECEP-TION | FFT | TRANSPOSI-TION-OUT |

| STREAM R2a | TRANSPOSI-TION-IN | TRANS-MISSION | RECEP-TION | FFT | TRANSPOSI-TION-OUT |

FIG. 28

EXAMPLE OF STREAMS IN INVERSE FFT

| STREAM R1b | TRANSPOSI-TION-IN | FFT | TRANS-MISSION | RECEP-TION | TRANSPOSI-TION-OUT |

| STREAM R2b | TRANSPOSI-TION-IN | FFT | TRANS-MISSION | RECEP-TION | TRANSPOSI-TION-OUT |

PARALLEL COMPUTER AND FFT OPERATION METHOD

CROSS-REFERENCE TO RELATED APPLICATION

This application is based upon and claims the benefit of priority of the prior Japanese Patent Application No. 2016-049137, filed on Mar. 14, 2016, the entire contents of which are incorporated herein by reference.

FIELD

The embodiments discussed herein relate to a parallel computer and an FFT operation method.

BACKGROUND

Recent years have seen the use of parallel computers that perform relatively large-scale calculations, for example, on problems in the field of science and technology. For example, a parallel computer uses many processors to perform calculations in a parallel manner. Individual processes operating on these processors perform calculation processing as a whole while exchanging numerical data among themselves. In this way, high operation performance is achieved.

While there are various physical problems in scientific computation, these problems could lead to a common problem format as numerical calculation processing performed in a computer. For example, to handle a physical problem, an operation called Fast Fourier Transform (FFT) is often used. FFT operations are used to calculate remote electrostatic potentials in molecular dynamics or to perform galaxy generation simulations. FFT operations are also used to solve basic equations in weather prediction, fluid analysis, structure analysis, etc. Namely, FFT operations can be applied in various fields.

See, for example, the following documents:
Japanese Laid-open Patent Publication No. 09-153029
Japanese Laid-open Patent Publication No. 2005-189970
Japanese Laid-open Patent Publication No. 2004-348493

When performing an FFT operation, a parallel computer divides input data into a plurality of data portions and performs FFT operations in a distributed manner by using a plurality of processors in a parallel manner. While communicating with each other, these processors as a whole generate an FFT operation result of the input data. An individual processor alternately repeats an FFT operation and a data communication for each of the plurality of data portions inputted thereto. However, an effective method for efficiently repeating an FFT operation and a data communication has not been developed. Namely, no existing FFT operations can be performed fast enough on input data.

SUMMARY

According to one aspect, there is provided a parallel computer including: a memory configured to include a first storage area, a second storage area, and a third storage area; and a processor configured to perform a procedure including: while executing a first process to perform an FFT (Fast Fourier Transform) operation by using the first storage area, executing a second process to transmit a calculated FFT calculation result stored in the second storage area to other processes and to store an FFT operation result received from said other processes in the third storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 illustrates an example of streams according to the second embodiment.

FIG. 27 illustrates comparative examples compared with FFT operations according to the second embodiment;

FIG. 28 illustrates an example of streams of a forward FFT operation according to a third embodiment;

FIG. 33 illustrates an example of streams of an inverse FFT operation according to the third embodiment;

DESCRIPTION OF EMBODIMENTS

Figure 1:
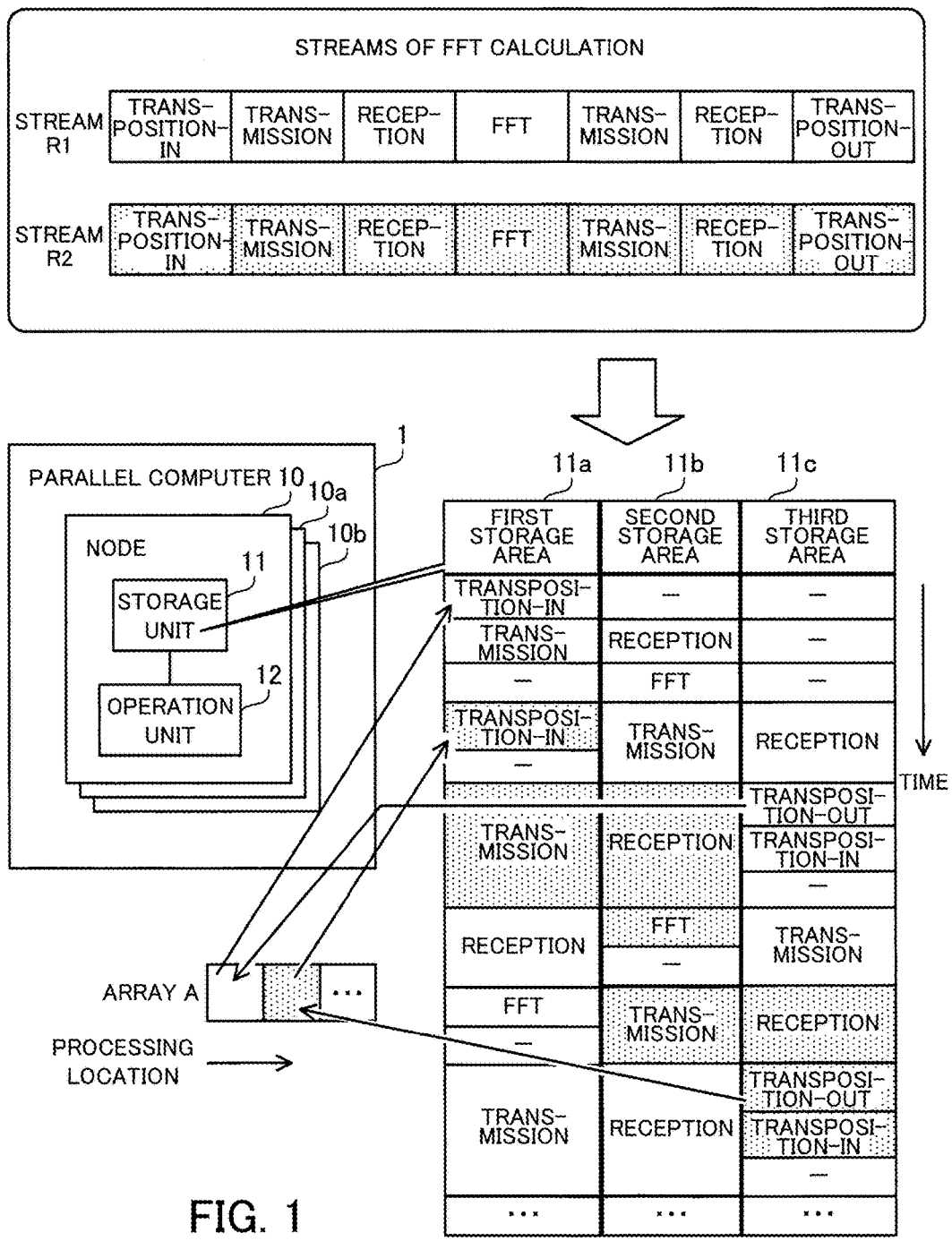
FIG. 1 illustrates an example of a parallel computer according to a first embodiment.

Embodiments will be described below with reference to the accompanying drawings, wherein like reference characters refer to like elements throughout.

First Embodiment

FIG. 1 illustrates a parallel computer 1 according to a first embodiment. The parallel computer 1 includes a plurality of nodes and uses these nodes to perform arithmetic processing in a parallel manner. The parallel computer 1 processes a three-dimensional (3D) FFT operation at high speed. The plurality of nodes include nodes 10, 10a, and 10b (more nodes may be included). The node 10 includes a storage unit 11 and an operation unit 12.

The storage unit 11 is a storage device such as a cache memory or a random access memory (RAM). Examples of the operation unit 12 include a central processing unit (CPU), a digital signal processor (DSP), an application specific integrated circuit (ASIC), and a field programmable gate array (FPGA). The operation unit 12 may be a processor that executes programs. The processor may include a group of processors (a multiprocessor). Other nodes also include a storage unit and an operation unit as the node 10 does. The operation unit 12 is able to manage arithmetic processing in units of processes. The operation unit 12 is able to start a plurality of processes in the node 10.

The parallel computer 1 divides input data, on which an FFT operation is to be performed, into a plurality of data portions and inputs a data portion to an individual node. The input data is represented as a 3D array, for example. The 3D array is represented by three axes of the X, Y, and Z axes. For example, an array A, which is one of the data portions obtained by dividing the input data, is inputted to the node 10. The node 10 performs an FFT operation data along each of the axes of the array A. Assuming that the node 10 performs FFT operations on data along the X, Y, and Z axes in this order, the node 10 performs an FFT operation on the data along the Y axis by using the FFT operation result obtained by performing an FFT operation on the data along the X axis. In addition, the node 10 performs an FFT operation on the data along the Z axis by using the FFT operation result obtained by performing the FFT operations on the data along the X and Y axes. If input data has been divided along a certain axis, individual processes on individual nodes communicate with each other and arrange data held therein so that the processes can perform respective FFT operations on the data along the corresponding axis in a parallel manner. A stream of an FFT operation performed by the parallel computer 1 is as follows.

(1) The operation unit 12 transposes information, which is a part of an array A in a certain axis direction along which FFT processing is to be performed, and stores the transposed information in a transmission buffer (transposition-in processing).

(2) The operation unit 12 transmits the data stored in the transmission buffer to other processes (the operation unit 12 may transmit the data to processes on other nodes) (first transmission processing).

(3) The operation unit 12 receives data from other processes and stores the received data (arranged data) in a reception buffer (first reception processing).

The communication processing (2) and the communication processing (3) are performed by executing individual processes in the parallel computer 1 to synchronize with each other (the processes belonging to a single process group that performs FFT operations in the certain axis direction). The first transmission processing and the first reception processing may be referred to as an "all-to-all communication" or a "collective communication" performed among processes.

(4) The operation unit 12 performs an FFT operation on the arranged data (FFT operation processing).

(5) The operation unit 12 transmits the data obtained by performing the FFT operation to other processes (second transmission processing).

(6) The operation unit 12 receives data obtained by performing FFT operations from other processes and stores the received data (data arranged in an original order) in a reception buffer (second reception processing). The second transmission processing and the second reception processing may be referred to as an "all-to-all communication" performed among processes.

(7) The operation unit 12 transposes the data in the reception buffer and stores the transposed data in the original array A (transposition-out processing).

The operation unit 12 divides the array A into smaller data segments and performs two streams, each indicated by the above (1) to (7), on the data segments in a parallel manner. One of the streams will be referred to as "stream R1," and the other stream will be referred to as "stream R2." For example, each of the streams R1 and R2 may be performed by a different process. It is possible to deem that the streams R1 and R2 are performed by different threads of a certain process.

The storage unit 11 includes a first storage area 11a, a second storage area 11b, and a third storage area 11c. The first to third storage areas 11a to 11c are work areas used for performing the procedure indicated by the above (1) to (7). Each of the first to third storage areas 11a to 11c only needs to be large enough to hold the size of a data segment. Namely, the total size of the first to third storage areas 11a to 11c is approximately three times the size of a data segment.

Each of the streams R1 and R2 corresponds to the FFT operation procedure indicated by the above (1) to (7) performed on each of the data segments obtained by dividing the array A. For example, the array A is sequentially divided into segments each having a predetermined size in ascending order of processing location along the FFT operation target axis (for example, a portion of the array A that has the smallest coordinate value is divided first). Hereinafter, the data segment in the closest processing location will be called first data segment, and the data segments in the second and third closest processing locations will hereinafter be called second and third data segments, respectively. The subsequent data segments will also be called in this way. In addition, FFT operations are sequentially performed. For example, first, the first data segment is processed by the stream R1, and the second data segment is processed by the stream R2. Next, the third data segment is processed by the stream R1, and the fourth data segment is processed by the stream R2. The subsequent data segments will also be processed by the stream R1 and R2 alternately. In this example, the odd-numbered data segments are processed by the stream R1, and the even-numbered data segments are processed by the stream R2.

By using the first to third storage areas 11a to 11c in the following way, the operation unit 12 performs an FFT operation and an inter-process communication in the streams R1 and R2 in an overlapping manner. The use of each of the first to third storage areas 11a to 11c is chronologically illustrated in FIG. 1 (a hyphen "-" denotes a period in which the corresponding storage area is not used for any processing purposes).

First, in the transposition-in processing of the stream R1, the operation unit 12 transposes the first data segment and stores the transposed first data segment in the first storage area 11a.

Next, in the first transmission processing of the stream R1, the operation unit 12 transmits the first data segment to other processes by using the first storage area 11a as a transmission buffer. In this period, in the first reception processing of the stream R1, the operation unit 12 receives a data segment, which has been transmitted in the first transmission processing performed by these other processes, and stores the received data segment in the second storage area 11b (used as a reception buffer).

Next, in the FFT operation processing of the stream R1, the operation unit 12 performs an FFT operation on the data stored in the second storage area 11b.

In the second transmission processing of the stream R1, the operation unit 12 transmits the FFT operation result stored in the second storage area 11b (used as a transmission buffer) to the other processes. In this period, in the second reception processing of the stream R1, the operation unit 12 receives a data segment, on which FFT operations have been performed and which has been transmitted in the second transmission processing performed by the other processes, and stores the received data segment in the third storage area (used as a reception buffer). In this period, the operation unit 12 also performs the transposition-in processing of the stream R2 on the second data segment, by using the first storage area 11a. Namely, in the transposition-in processing of the stream R2, the operation unit 12 transposes and stores the second data segment in the first storage area 11a.

Thereafter, for each of the streams R1 and R2, the operation unit 12 repeats the following procedure.

In the stream R1, the operation unit 12 performs the transposition-out processing on the first data segment by using the third storage area 11c and performs the transposition-in processing on the third data segment. In this period, in the stream R2, the operation unit 12 performs the first transmission processing and the first reception processing by using the first storage area 11a (transmission buffer) and the second storage area 11b (reception buffer).

Next, in the stream R1, the operation unit 12 performs the first transmission processing and the first reception processing by using the third storage area 11c (transmission buffer) and the first storage area 11a (reception buffer). In this period, in the stream R2, the operation unit 12 performs the FFT operation processing by using the second storage area 11b.

Next, in the stream R1, the operation unit 12 performs the FFT operation processing by using the first storage area 11a. In this period, in the stream R2, the operation unit 12 performs the second transmission processing and the second reception processing by using the second storage area 11b (transmission buffer) and the third storage area 11c (reception buffer).

Next, in the stream R1, the operation unit 12 performs the second transmission processing and the second reception processing by using the first storage area 11a (transmission buffer) and the second storage area 11b (reception buffer). In this period, in the stream R2, the operation unit 12 first performs the transposition-out processing on the second data segment and next performs the transposition-in processing on the fourth data segment by using the third storage area 11c. In this way, in the streams R1 and R2, the operation unit 12 sequentially performs FFT operations on the data segments of the array A while switching the use of each of the first to third storage areas 11a to 11c. In this way, the operation unit overlaps the FFT operation in one stream with the communication in the other stream while limiting the work storage areas to the first to third storage areas 11a to 11c. As a result, the operation unit 12 is able to perform the FFT operation at high speed. As one specific example, overlapping of an FFT operation and a communication in a Z direction will be described (like overlapping is also performed in the X and Y directions).

Figure 2:
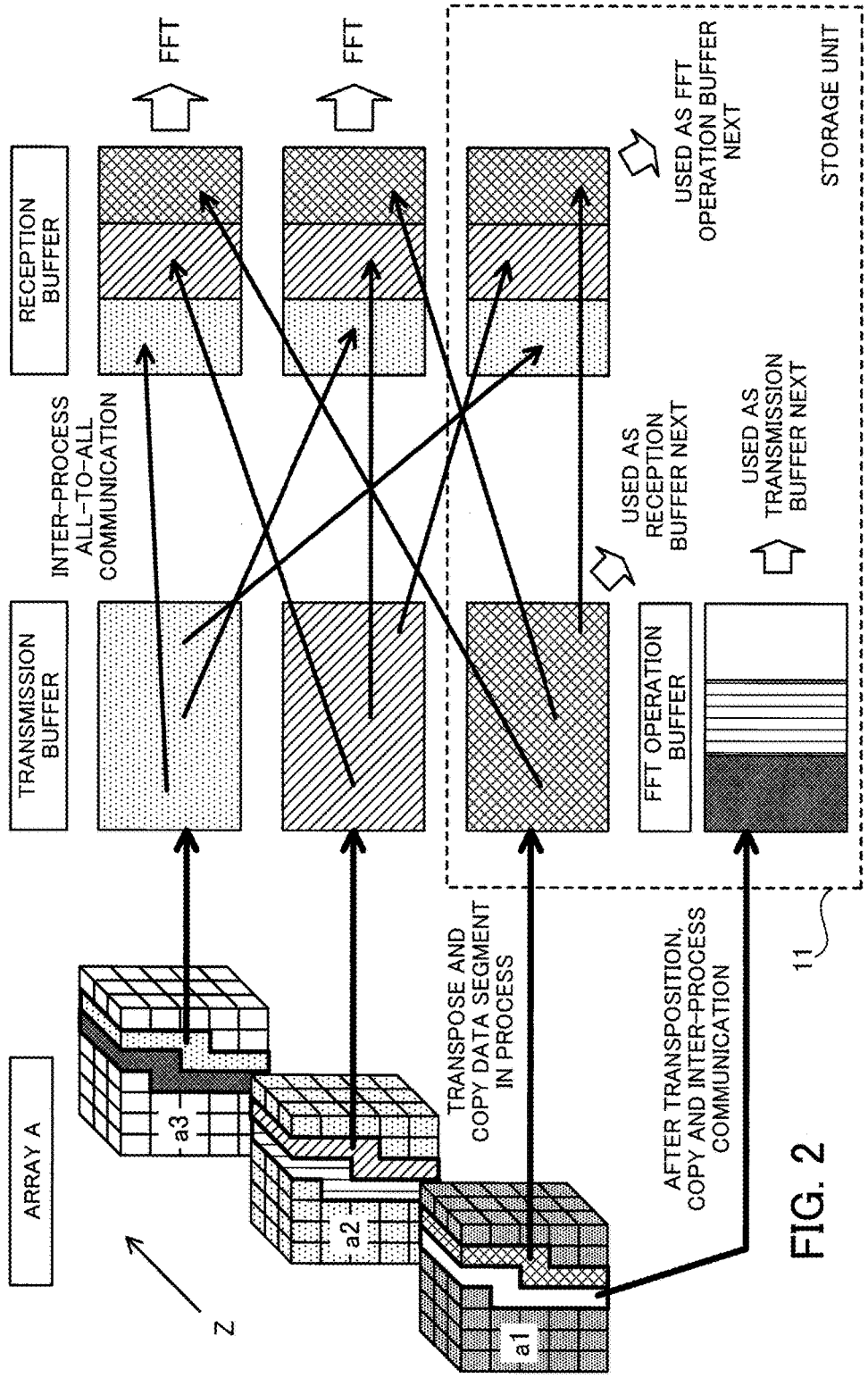
FIG. 2 illustrates an example of overlapping of an FFT operation and a communication in a Z direction.

FIG. 2 illustrates an example of overlapping of an FFT operation and a communication in a Z direction. For example, 3D arrays a1 to a3, each obtained by dividing 3D array input data, are inputted to the nodes 10 to 10b, respectively. For example, processes that operate on the nodes 10 to 10b may perform a plurality of streams R1 on the respective nodes while synchronizing with each other. In addition, other processes that operate on the nodes 10 to 10b may perform a plurality of streams R2 on the respective nodes while synchronizing with each other. For example, one process on the node 10 handles the array a1. In FIG. 2, how each of the three storage areas (the first to third storage areas 11a to 11c) of the storage unit 11 is used at an individual timing is also illustrated. Specifically, for a certain data segment of the array a1, an FFT operation buffer used in the stream R1 is provided. In addition, for the data segment that follows this data segment of the array a1, a transmission buffer and a reception buffer used in the stream R2 are provided. In this way, the operation unit 12 is able to overlap an FFT operation in the stream R1 with the all-to-all communication in the stream R2 (in a parallel manner).

At the next timing, the transmission buffer of the storage unit 11 is switched to serve as the reception buffer used in the second reception processing of the stream R1. In addition, the reception buffer of the storage unit 11 is switched to serve as the FFT operation buffer used in the stream R2. In addition, the FFT operation buffer of the storage unit 11 is switched to serve as the transmission buffer used in the second transmission processing of the stream R1. At the next timing, the operation unit 12 is able to overlap the FFT operation in the stream R2 with the all-to-all communication in the stream R1.

Namely, the operation unit 12 executes, while executing a first process to perform an FFT operation by using the first storage area, a second process to transmit a calculated FFT calculation result stored in the second storage area to other processes and to store an FFT operation result received from said other processes in the third storage area. In this way, while performing an FFT operation in one stream, the operation unit 12 performs an inter-process collective communication in the other stream and arranges the FFT operation results. Consequently, the operation unit 12 performs the FFT operation at high speed.

In addition, since the operation unit 12 performs the FFT operation while switching the use of each of the three storage areas (a transmission buffer, a reception buffer, and an FFT operation buffer), increase in the memory consumption amount is prevented. For example, as described above, the size of an individual storage area can be determined on the basis of the size of a data segment. Thus, by determining the size of a data segment so that the three storage areas are accommodated in a Level 2 (L2) cache or the like, the parallel computer 1 is able to perform an FFT operation at high speed while achieving memory saving.

Next, the above method for performing an FFT operation at high speed will be described in more detail by using a parallel computer used in large-scale scientific computation as an example.

Second Embodiment

Figure 3:
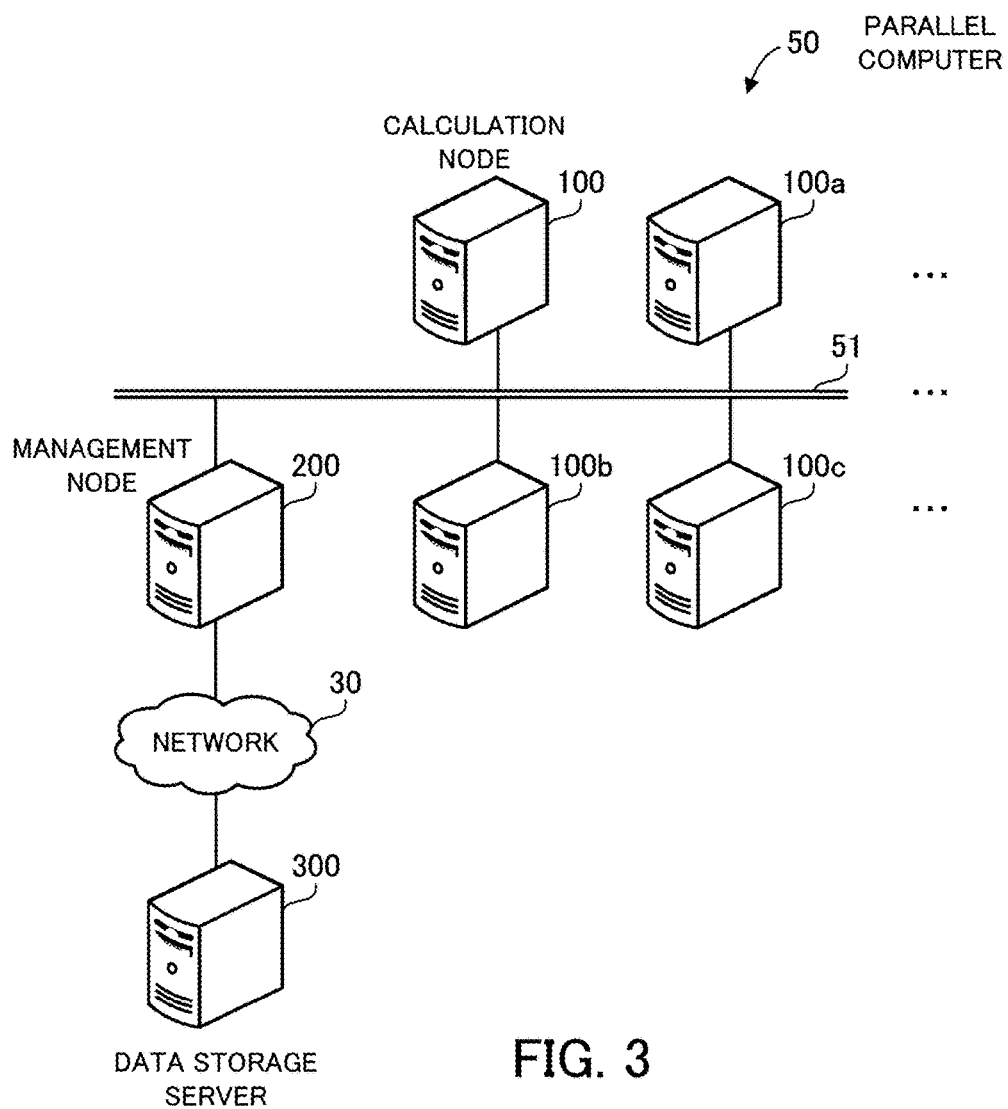
FIG. 3 illustrates an example of a parallel computer according to a second embodiment.

FIG. 3 illustrates an example of a parallel computer 50 according to a second embodiment. The parallel computer 50 according to the second embodiment includes calculation nodes 100, 100a, 100b, 100c, etc. and a management node 200. The calculation nodes 100, 100a, 100b, 100c, etc. and the management node 200 are connected to a network 51. The network 51 may be a direct network such as Mesh or Torus. Alternatively, the network 51 may be an indirect network such as Fat-tree or cross-bar connected via communication switches. The parallel computer 50 performs various kinds of operation in a parallel manner by using a plurality of nodes. The parallel computer 50 may be referred to as a super computer system or a high performance computing (HPC) system, for example.

Each of the calculation nodes 100, 100a, 100b, 100c, etc. is a processing mechanism that includes one or more CPUs that share a memory.

The management node 200 manages jobs executed by the calculation nodes 100, 100a, 100b, 100c, etc. For example, the management node 200 receives an instruction for execution of a job from a user and inputs a job to the calculation nodes 100, 100a, 100b, 100c, etc. In addition, the management node 200 arranges programs executed by the calculation nodes 100, 100a, 100b, 100c, etc. in the calculation nodes 100, 100a, 100b, 100c, etc.

The management node 200 is also connected to a network 30. The network 30 may be a local area network (LAN), a wide area network (WAN), or the Internet, for example. The management node 200 is able to acquire programs executed by the calculation nodes or data used in processing performed by the calculation nodes from a data storage server 300 connected to the network 30 and provide the calculation nodes with the programs or the data. The data storage server 300 is a server computer that distributes programs or data.

Figure 4:
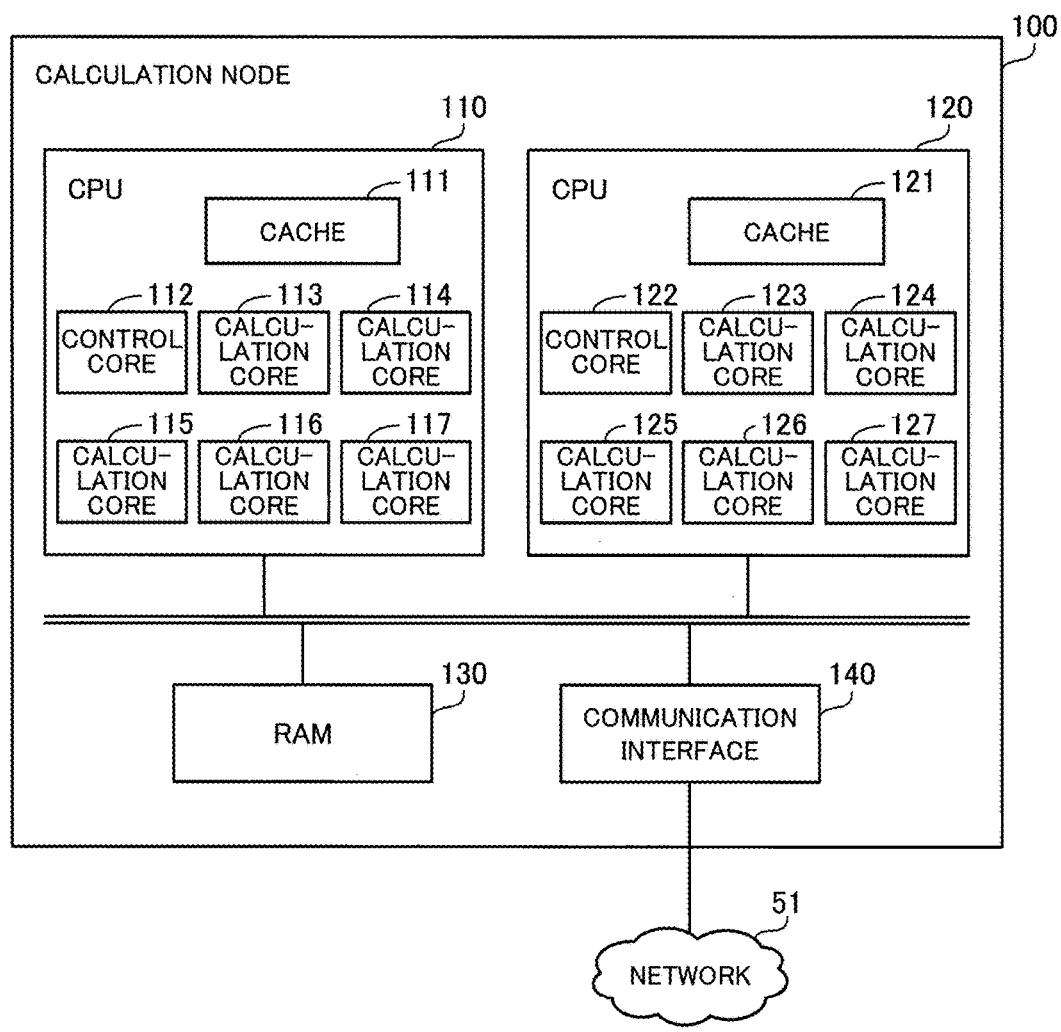
FIG. 4 illustrates a hardware example of a calculation node.

FIG. 4 illustrates a hardware example of a calculation node. The calculation node 100 includes CPUs 110 and 120, a RAM 130, and a communication interface 140. These units are connected to a bus of the calculation node 100. The calculation nodes 100a, 100b, 100c, etc. and the management node 200 may also be realized by using units equivalent to those of the calculation node 100.

The CPU 110 controls information processing of the calculation node 100. The CPU 110 includes a cache 111, a control core 112, and calculation cores 113 to 117.

The cache 111 is a cache memory used for processing by the control core 112 and the calculation cores 113 to 117. For example, the cache 111 has a hierarchical structure including a Level 1 (L1) cache or an L2 cache.

The control core 112 is a control core that handles inter-process communications. The calculation cores 113 to 117 are operation cores that perform FFT operations.

As with the CPU 110, the CPU 120 also includes a cache 121, a control core 122, and calculation cores 123 to 127.

The RAM 130 is a main storage device of the calculation node 100 and is a shared memory shared by the CPUs 110 and 120. The RAM 130 temporarily holds at least a part of the programs executed by the CPUs 110 and 120. The RAM 130 holds various kinds of data used in processing by the CPUs 110 and 120.

The communication interface 140 communicates with the other nodes via the network 51.

Figure 5:
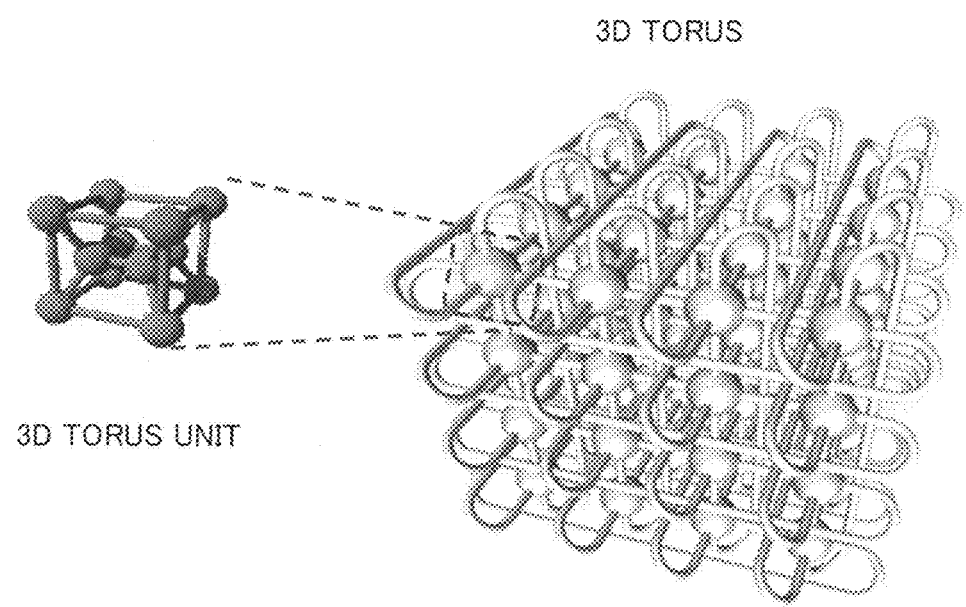
FIG. 5 illustrates a network example.

FIG. 5 illustrates an example of the network 51. For example, the network 51 is realized as a 6D mesh/torus direct network referred to as Tofu (registered mark). In Tofu, 12 calculation nodes form a single unit (a 3D torus unit), and the individual units are connected with each other by using a 3D torus configuration. In Tofu, by accommodating appropriate nodes in a 3D process shape, congestion of communication data is prevented in any axis direction. Thus, Tofu has high compatibility with multiaxial distribution techniques used for the FFT operations described below.

Figure 6:
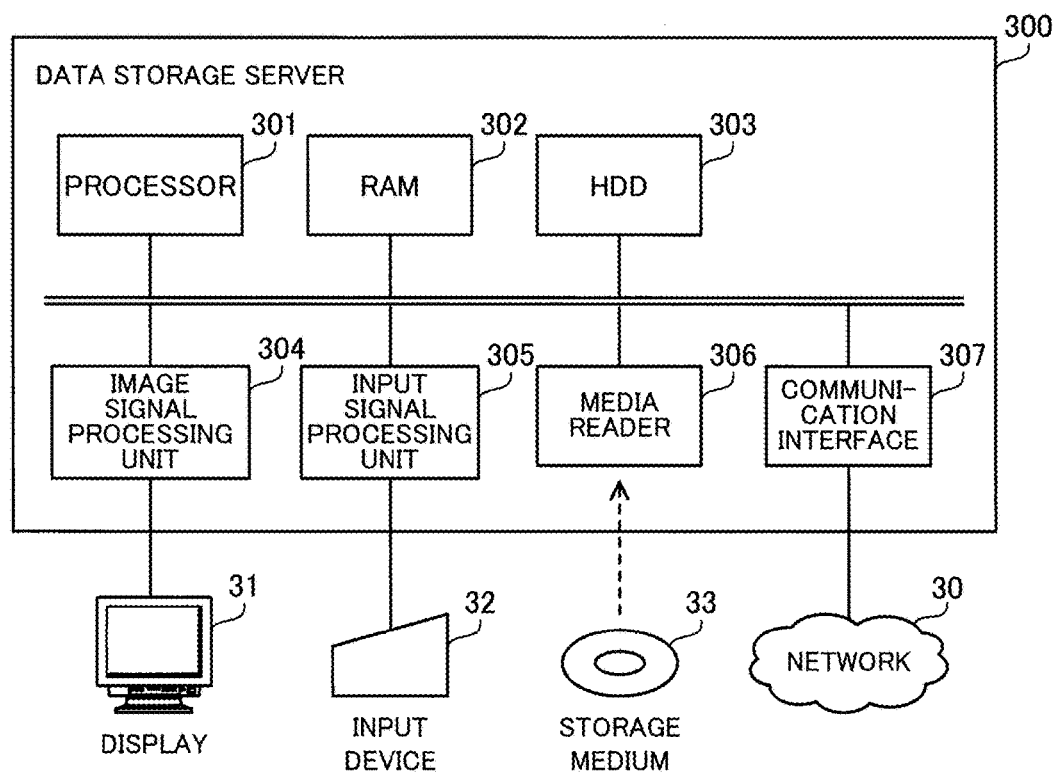
FIG. 6 illustrates a hardware example of a data storage server.

FIG. 6 illustrates a hardware example of the data storage server 300. The data storage server 300 includes a processor 301, a RAM 302, a hard disk drive (HDD) 303, an image signal processing unit 304, an input signal processing unit 305, a media reader 306, and a communication interface 307. These units are connected to a bus of the data storage server 300.

The processor 301 controls information processing of the data storage server 300. The processor 301 may be a multiprocessor. For example, the processor 301 is a CPU, a DSP, an ASIC, or an FPGA. The processor 301 may be a combination of at least two of the elements such as a CPU, a DSP, an ASIC, and an FPGA.

The RAM 302 is a main storage device of the data storage server 300. The RAM 302 temporarily holds at least a part of the operating system (OS) programs and application programs executed by the processor 301. In addition, the RAM 302 holds various kinds of data used in processing performed by the processor 301.

The HDD 303 is an auxiliary storage device of the data storage server 300. The HDD 303 magnetically reads and writes data on its internal magnetic disk. The HDD 303 holds OS programs, application programs, and various kinds of data. The data storage server 300 may include a different kind of auxiliary storage device such as a flash memory or a solid state drive (SSD) and may include a plurality of auxiliary storage devices.

The image signal processing unit 304 outputs an image to a display 31 connected to the data storage server 300 in accordance with an instruction from the processor 301.

Examples of the display 31 include a cathode ray tube (CRT) display and a liquid crystal display (LCD).

The input signal processing unit 305 acquires an input signal from an input device 32 connected to the data storage server 300 and outputs the input signal to the processor 301. Examples of the input device 32 include a pointing device such as a mouse or a touch panel and a keyboard.

The media reader 306 is a device that reads programs and data recorded in the storage medium 33. Examples of the storage medium 33 include a magnetic disk such as a flexible disk (FD) or an HDD, an optical disc such as a compact disc (CD) or a digital versatile disc (DVD), and a magneto-optical disk (MO). For example, as the storage medium 33, a non-volatile semiconductor memory such as a flash memory card may be used. For example, the media reader 306 stores programs and data read from the storage medium 33 in the RAM 302 or the HDD 303 in accordance with an instruction from the processor 301.

The communication interface 307 communicates with another device (for example, the management node 200) via the network 30. The communication interface 307 may be a wired or wireless communication interface.

Next, general FFT operation processing methods will be described. FFT operations can be classified according to how data is distributed. Specifically, first, the entire 3D input data, on which an FFT calculation is to be performed, is deemed as a single virtual global array (which will simply be referred to as a global array). Next, how this global array is divided into a plurality of local arrays allocated to a plurality of processes is considered. Specifically, a global array may be divided on the basis of uniaxial distribution (planar distribution), biaxial distribution (columnar distribution), or triaxial distribution. The uniaxial distribution is also referred to as slab decomposition. The biaxial distribution is also referred to as pencil-wise or column-wise decomposition. The triaxial distribution is also referred to as volumetric decomposition. Increase in the number of processes can be managed more easily by increasing the number of division axes. Thus, when a multidimensional direct communication network is used, for example, since the communication topology shape and the data distribution shape can be easily matched, biaxial or triaxial distribution techniques tend to be used these days.

Hereinafter, the size of a global array, on which a 3D FFT calculation is to be performed, will be represented by N1 to N3, and the division numbers in the three axis directions will be represented by P1 to P3, respectively. N1 is the number of data elements of the global array in the X-axis direction. N2 is the number of data elements of the global array in the Y-axis direction. N3 is the number of data elements of the global array in the Z-axis direction. P1 is the division number in the X-axis direction. P2 is the division number in the Y-axis direction. P3 is the division number in the Z-axis direction.

The size of a local array obtained by dividing the global array will be represented by N1P to N3P. N1P is the number of data elements of the local array in the X-axis direction. N2P is the number of data elements of the local array in the Y-axis direction. N3P is the number of data elements of the local array in the Z-axis direction. In addition, when a natural number N is divisible by P, this will be represented by mod (N, P)=0.

In addition, the following description will be made assuming that data is consecutively stored on a memory in X, Y, and Z directions in this order. In the 3D FFT calculation, an FFT operation is performed in each of the X, Y, and Z directions. When an FFT operation in an individual direction is performed, first, data in the processing target direction is collected in a process through an inter-process communication. The calculations in the X, Y, and Z directions may be performed in any order.

Figure 7:
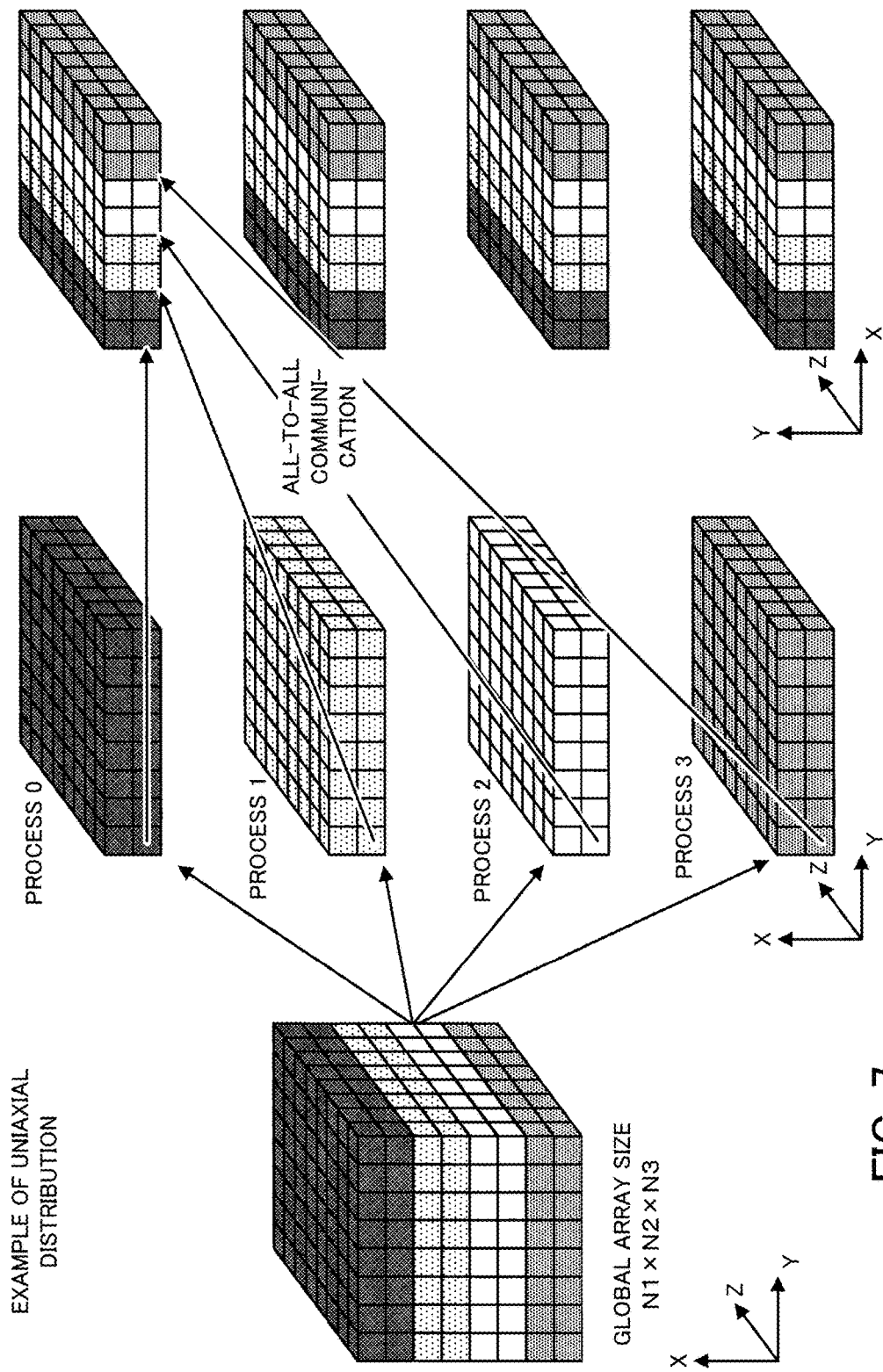
FIG. 7 illustrates an example of uniaxial distribution.

FIG. 7 illustrates an example of uniaxial distribution. FIG. 7 illustrates an example in which a global array having a size of N1×N2×N3 is allocated to four processes. For example, first, regarding the FFT operations in the Y and Z directions, since an individual process has its target data, the individual process can perform the FFT operations without communicating with the other processes. However, regarding the FFT operation in the X direction, since the target data has been divided and stored in the other processes, the individual process performs a collective communication referred to as an all-to-all communication in Message Passing Interface (MPI) among the processes and collects the FFT target data in the X direction. In this way, the processes perform their X-direction FFT operations in a parallel manner. To restore the original data arrangement, which is the arrangement after the input data is divided in the X direction, the processes perform an all-to-all communication again (there are cases in which this communication is omitted, as will be described below).

Next, the buffer areas needed for FFT operations and overlapping of a communication and an operation will be described. For a communication, work areas referred to as a transmission buffer and a reception buffer are arranged on a memory. If a normal algorithm is used without change and if a local array in which input data is stored is used as a transmission buffer without change, a reception buffer having the same size as that of the transmission buffer is used. Since there is a data dependency relationship regarding the sequence of the FFT calculations in the Y and Z directions, a single collective communication (all-to-all communication), and the FFT calculation in the X direction, a communication and a calculation are not able to be performed simultaneously. By segmenting the communication and operation range into small cuboids in the Z direction, overlapping of a communication and a calculation can be achieved. Specifically, first, the entire FFT processing in the Z direction is performed, and next, the FFT processing in the Y direction is partially performed. Finally, an individual process transmits the data in the range in which the partial processing has been performed. Consequently, an individual process is able to collect the FFT data in the X direction. If an individual process performs the next FFT partial processing in the Y direction simultaneously with the above communication, overlapping of the communication and the operation can be achieved. Alternatively, by performing the FFT processing in the X direction on the previously received data during the communication of the next segment, overlapping of the communication and the operation can be achieved. The data obtained from the X-direction FFT processing needs to be held. Thus, in one possible method, the data is outputted to another array having the same size as that of the local array in which the input data is stored.

If the problem size is $N^3$, even when there are N nodes or more, data distribution are not able to be performed. Thus, one of the problems with the uniaxial distribution is that the advantageous effect obtained from the use of parallel nodes is not promising. While N is up to approximately thousands, which is a normal size practically used, recent large-scale parallel computers use tens of thousands of nodes. In addition, in view of the compatibility with a direct network and the impact of the message length on the performance, the demand for dividing a global array by a plurality of axes is increasing. Since a single process group performs a collective communication in uniaxial distribution, more processes are used in a single group, and a shorter message length is used. Thus, the overlapping of a communication and an operation performed by using the processing segmentation is less effective, compared with the biaxial or triaxial distribution described below. In addition, the Z-direction FFT calculation is not able to be overlapped with a communication in accordance with the above method.

Figure 8A:
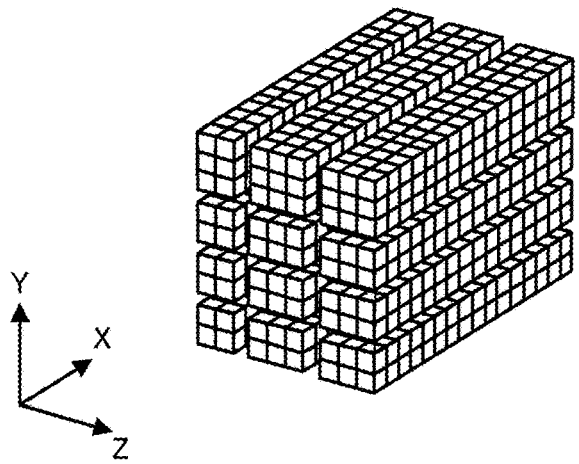
FIGS. 8A to 8C illustrate an example of biaxial distribution.
Figure 8B:
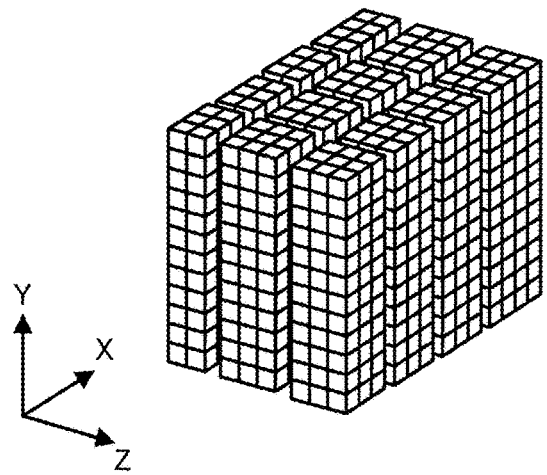
Figure 8C:
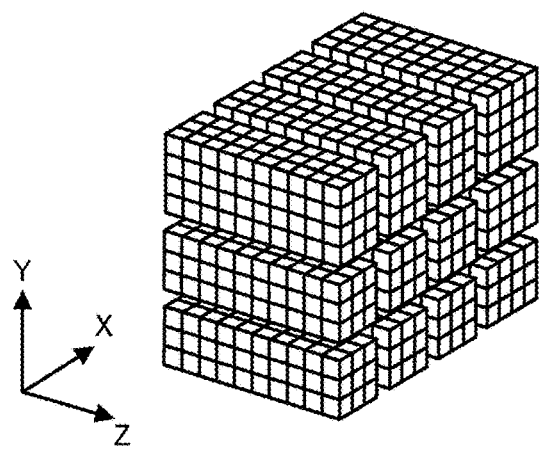

FIGS. 8A to 8C illustrate an example of biaxial distribution of a 4×3 process shape. In this method, a data distribution technique for dividing a global array into columnar local arrays is used. For example, first, an individual process performs a column-wise FFT calculation in the X direction (FIG. 8A). Next, an all-to-all communication is performed among the processes that belong to a process group separated on the XY plane. In this way, the global array is divided into columnar local arrays in the Y direction, and an individual process performs an FFT calculation in the Y direction (FIG. 8B). Next, an all-to-all communication is performed among the processes that belong to a process group separated on the YZ plane. In this way, the global array is divided into columnar local arrays in the Z direction, and an individual process performs an FFT calculation in the Z direction (FIG. 8C). In this example, while the input data is divided into columns in the X direction, the output data is obtained as columns in the Z direction. To obtain output data as columns in the X direction, a communication for rearrangement is performed separately.

Next, the buffer areas and overlapping of a communication and an operation in the case of the biaxial distribution will be described. To efficiently use an all-to-all communication, data areas for transmitting data to the other processes need to be formed as consecutive partial areas. Thus, in the communications before the Y- and Z-direction FFT operations, first, the data needs to be arranged consecutively in the Y and Z directions, respectively. Next, the arranged data needs to be stored in a transmission buffer and transmitted to a function that performs an all-to-all communication. In addition, generally, the data number is not always dividable, depending on the arrangement before or after a communication. Thus, there are cases in which an empty area is added to divide the data equally before an all-to-all communication function is used. In this case, a local array holding input data is not directly usable as a transmission buffer or a reception buffer. Namely, assuming that an individual local array is divided into small cuboids for overlapping of a communication and an operation, buffer areas having at least approximately four segment sizes are needed (two transmission buffers and two reception buffers for overlapping processing) (if in-place processing is performed without omitting a communication for restoring the original data arrangement).

Figure 9:
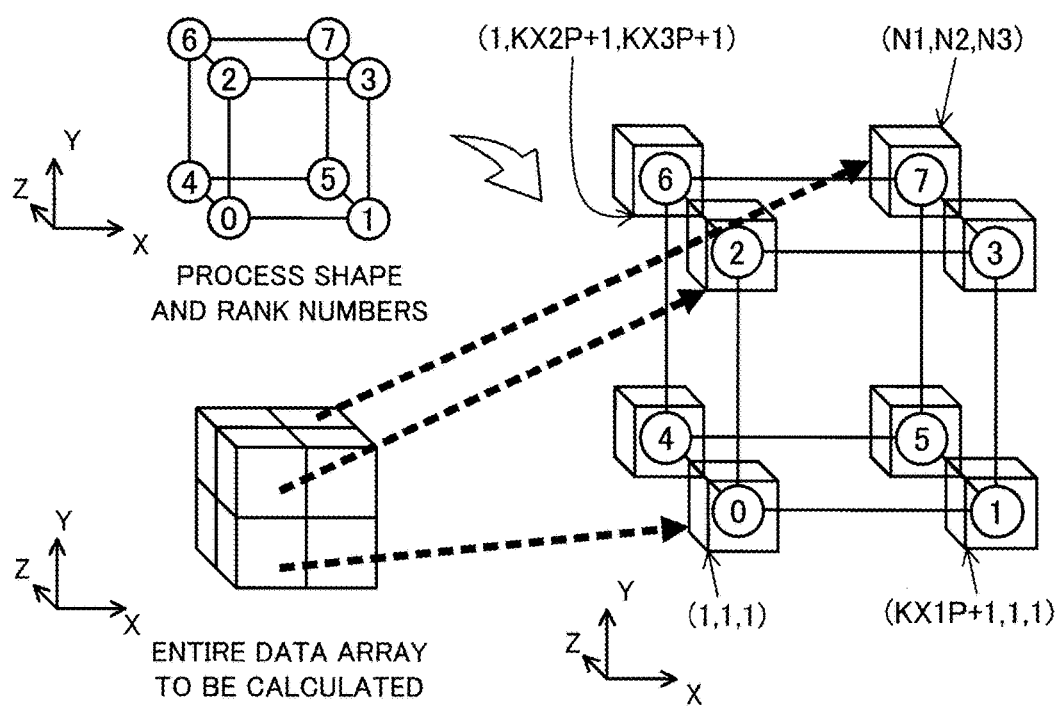
FIG. 9 illustrates an example of triaxial distribution.

FIG. 9 illustrates an example of triaxial distribution. In the triaxial distribution, a data distribution technique in which a global array is divided in all directions and is stored in local arrays is used. In triaxial distribution, the FFT target data in any of the X, Y, and Z directions is not accommodated in a single process. Thus, a communication is performed for an FFT calculation in an individual direction. If an individual communication for restoring the original data arrangement is not omitted, the FFT calculations in all the axis directions are performed in the same manner. Thus, a Z-axis direction FFT will hereinafter be described. In FIG. 9, a rank number indicates a process location in the torus space.

If processing by only a single process group in the Z-axis direction is considered, this processing corresponds to the FFT processing in the Z-axis direction in the uniaxial distribution on the data distributed in the Z-axis direction. However, this example assumes more general conditions than those with the simple segmentation to planar shapes illustrated in the example of uniaxial distribution. For example, the Z-direction FFT multiplicity indicated by the processes on the XY plane that belong to a certain process group is distributed by the division number P3. The multiplicity is represented by N1P×N2P=(N1/P1)×(N2/P2). The following three constraints are imposed so that the number of data elements will be the same among the processes after a communication. The first condition is mod(N1P×N2P,P3)=0. The second condition is mod(N2P×N3P,P1)=0. The third condition is mod(N3P×N1P,P2)=0.

Next, the buffer areas and overlapping of a communication and an operation in the case of the triaxial distribution will be described. First, while the FFT processing in an individual axis direction corresponds to the FFT processing in a certain axis direction in the uniaxial distribution, the overlapping of a communication and the previous FFT calculation described in the above uniaxial distribution are not applicable. This is because a communication is included during the process of the previous FFT calculation. In addition, compared with the uniaxial distribution, the communication and operation range segmentation method under the general conditions in which simple cuboidal segments are not used is more complex. For example, a simple case in which a global array having a size of 100×60×80 is divided by a process grid of 2×2×5 and a triaxial distribution FFT operation is performed will be considered. If a single process group in the Z-axis direction is focused, five processes that belong to this process group perform FFT calculations on local array data of 50×30×80. More specifically, the five processes perform FFT calculations on the Z-direction 80 elements 1,500 times (50×30=1,500). In addition, segmentation is needed for the overlapping of a communication and an operation. For example, if a local array is divided into four segments, the number of FFT calculations per segment is 1,500/4=375, and a single process handles 375/5=75 calculations.

Figure 10:
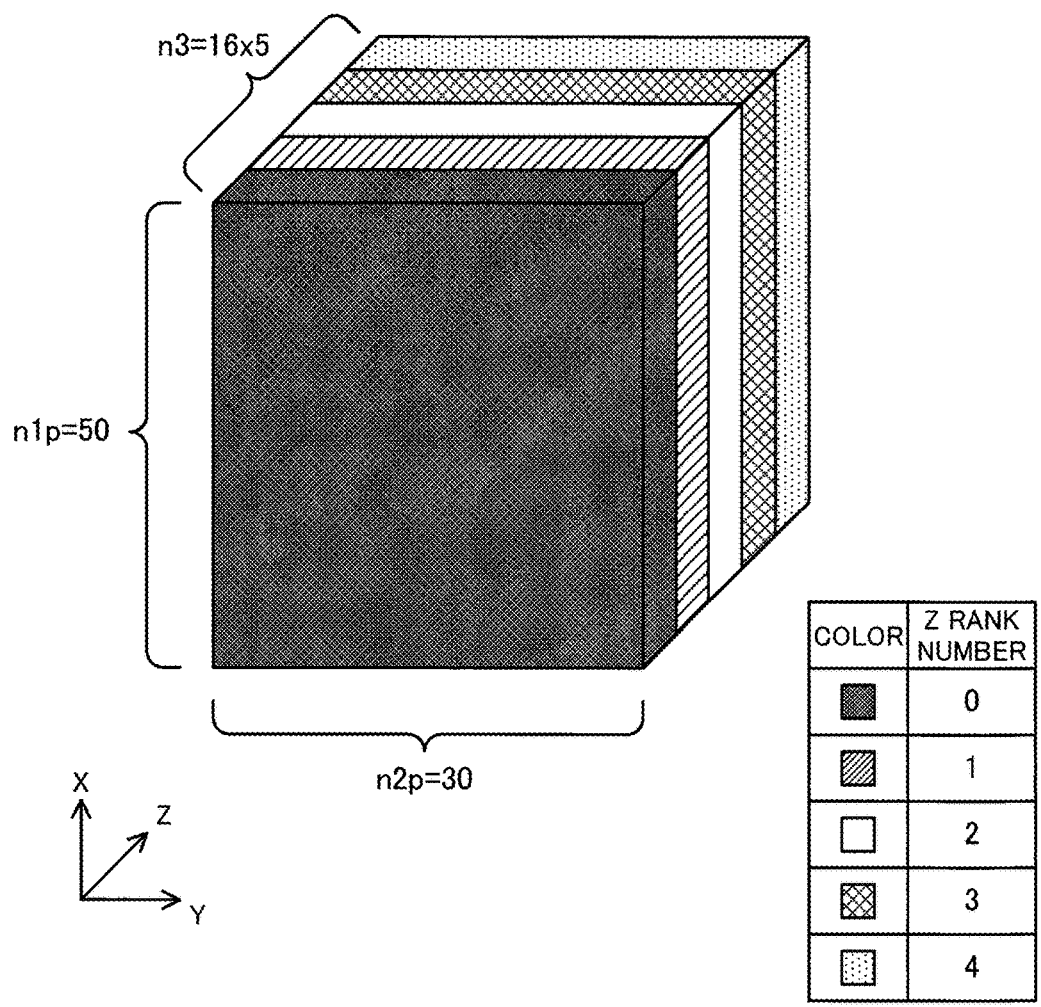
FIG. 10 illustrates an example of data held by a single z-direction process group.

FIG. 10 illustrates an example of data held by a single z-direction process group. In FIG. 10, the data in a local array having a shape of 50×30×80 processed by the five processes that belong to a process group in the Z-axis direction is indicated by different colors. In the example in FIG. 10, a process having a larger Z rank number holds data located at a larger value on the Z axis.

Figure 11:
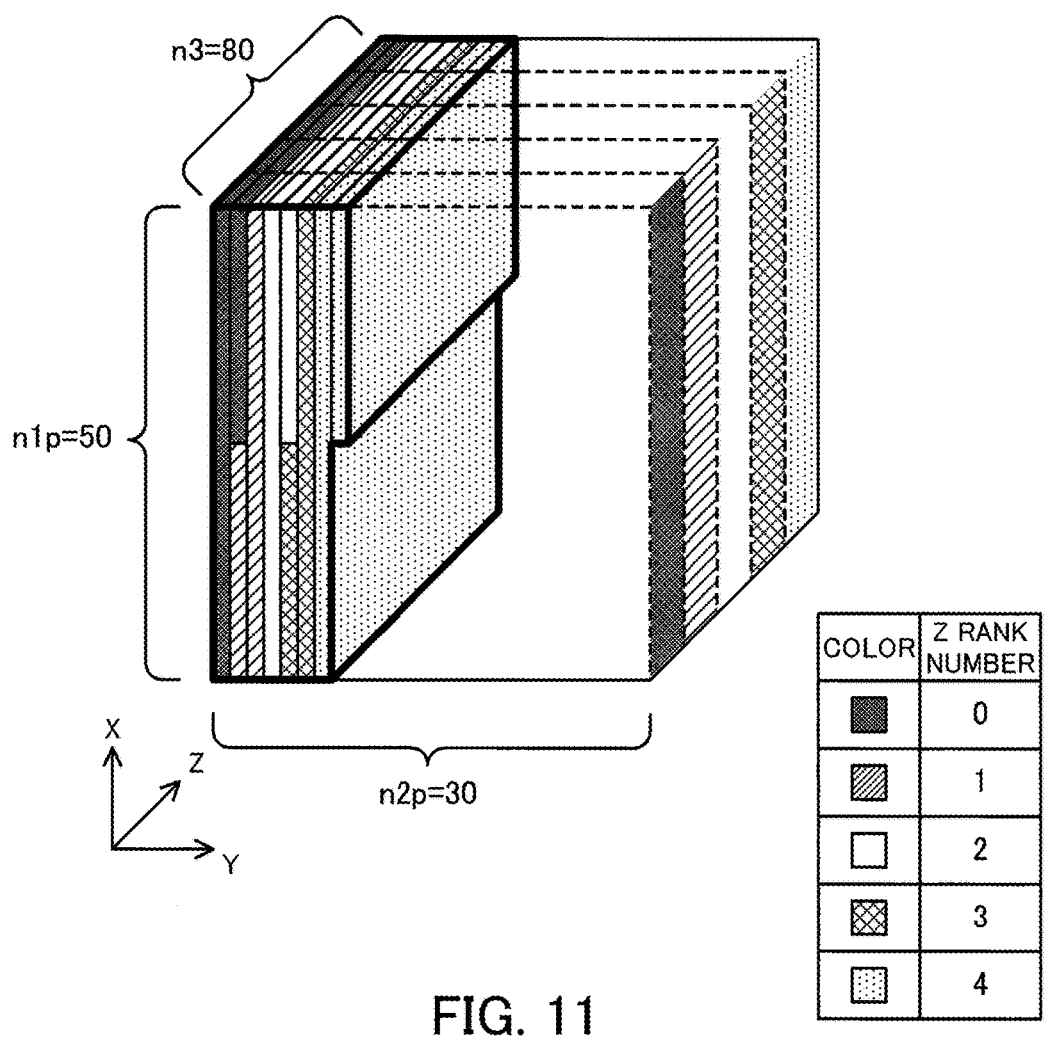
FIG. 11 illustrates an example of data (first segment) handled by an individual process.

FIG. 11 illustrates an example of data (first segment) handled by an individual process. FIG. 11 illustrates a range handled by an individual process after the local array is divided into segments and the first segment is moved in initial processing. Overlapping of a communication and an operation is enabled by executing an individual process to simultaneously perform a Z-direction FFT calculation on the first segment and a communication of the next segment (second segment).

Figure 12:
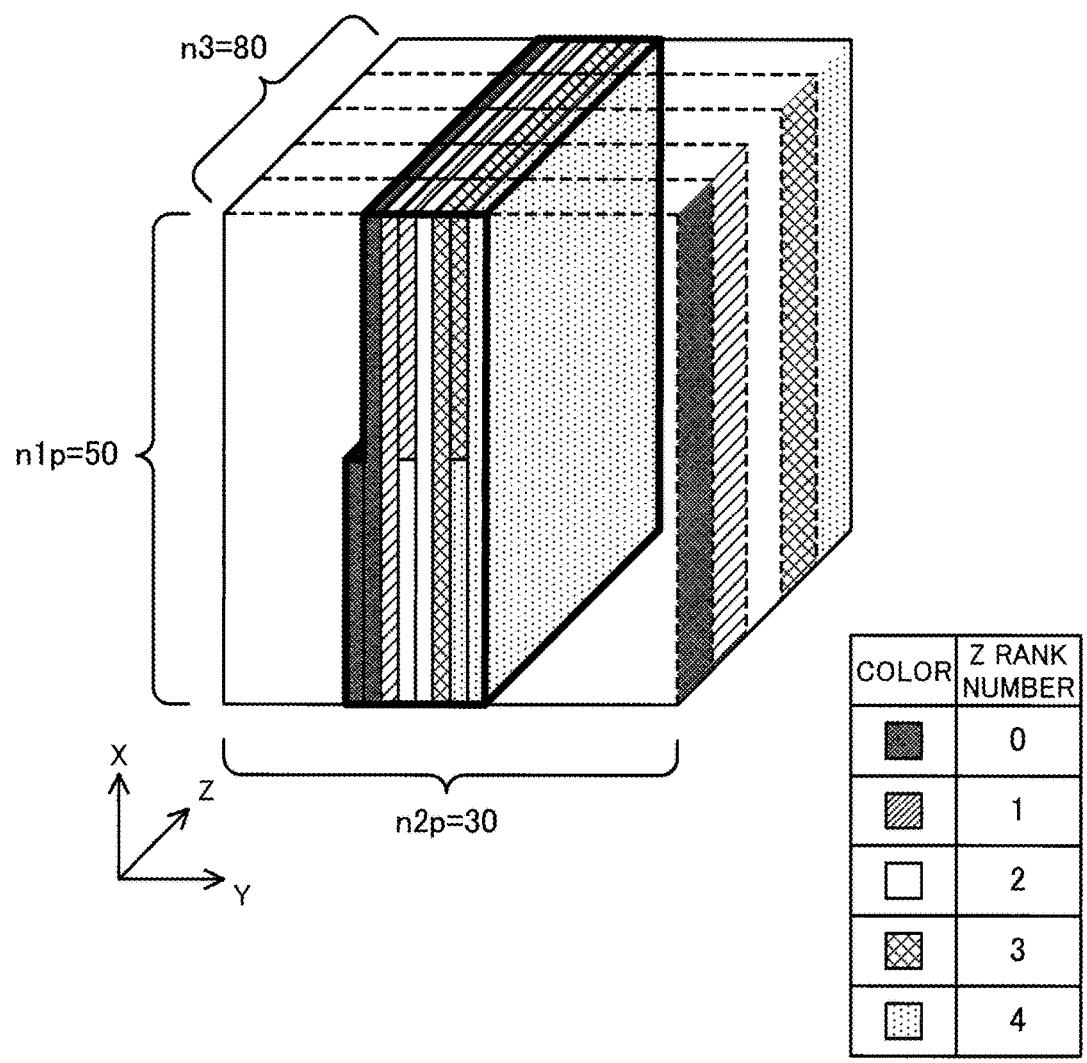
FIG. 12 illustrates an example of data (second segment) handled by an individual process.

FIG. 12 illustrates an example of data (second segment) handled by an individual process. Assuming that the segmentation illustrated in FIGS. 11 and 12 is performed, buffer areas having at least approximately four segment sizes are needed for an FFT calculation (two transmission buffers and two reception buffers for overlapping processing) (if in-place processing is performed without omitting a communication for restoring the original data arrangement).

If data arrangement is performed by a single collective communication without segmentation, the above three constraints are imposed. In contrast, if processing segmentation is performed, since a remainder obtained as a result of the division is processed as data smaller than a buffer size, implementation without constraints can easily be made. Thus, as will be described below, in the parallel computer 50, the segment size is determined somewhat freely so that the buffer areas only need approximately three segment sizes. Namely, the parallel computer 50 provides a function of efficiently overlapping an operation and a communication.

The segment size is determined based on general performance characteristics of the processing efficiency of the data communication function or operation function in the parallel computer 50. Thus, the performance characteristics will be described below.

Figure 13:
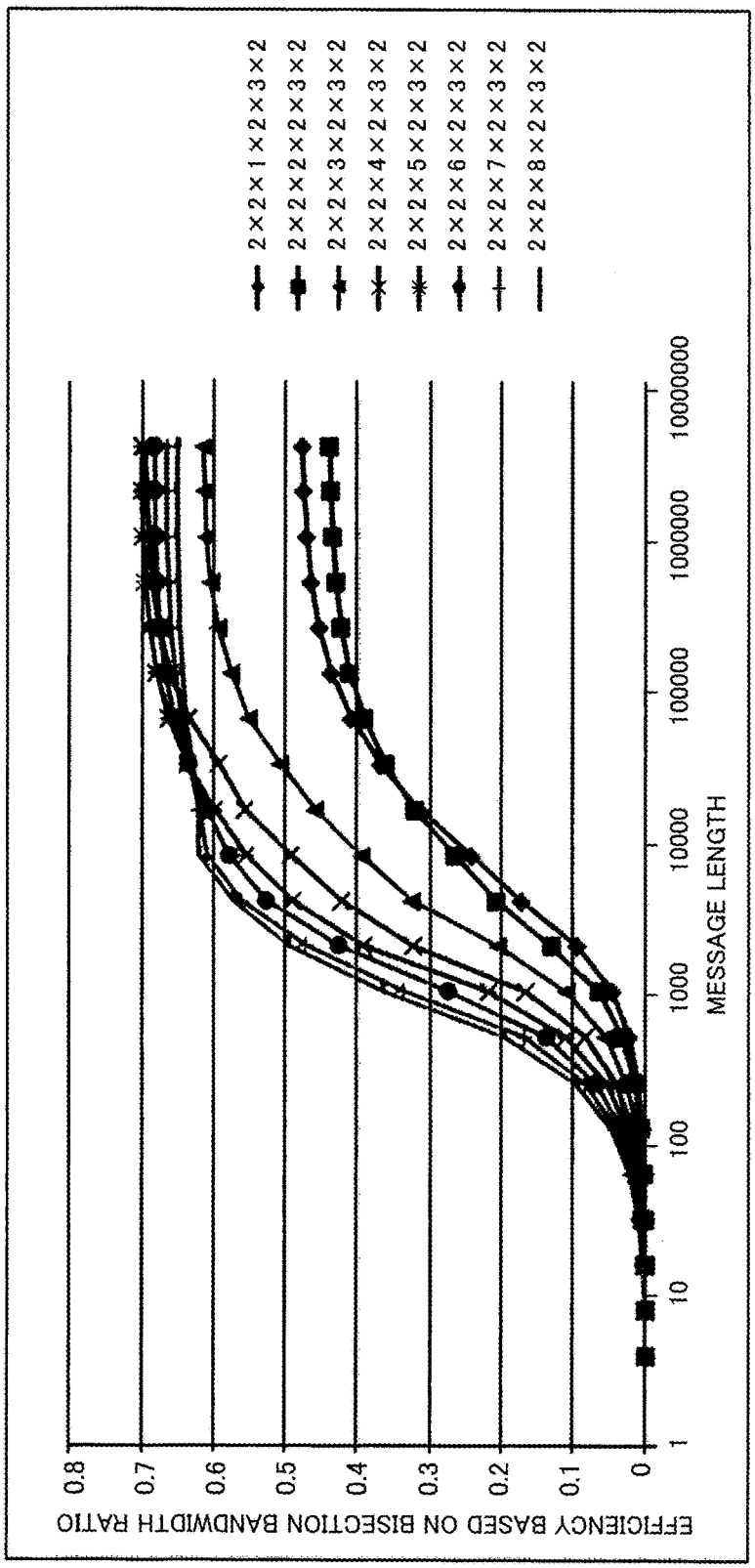
FIG. 13 illustrates an example of a relationship between a communication processing unit size and communication performance.

FIG. 13 illustrates an example of a relationship between a communication processing unit size and communication performance. In FIG. 13 is a graph of a message length, which is an inter-process communication processing unit, and a communication efficiency ratio with respect to hardware peak performance. In an all-to-all communication, the message length corresponds to a value obtained by dividing an array segment size handled by an individual process with the number of processes that belong to a process group that performs the communication.

The communication time in an all-to-all communication can be estimated by the following expression (1).

$$T = L_{collective} + \frac{MP^2}{4\alpha B} \quad (1)$$

In this expression (1), T represents the communication time. $L_{collective}$ represents the collective communication latency. M represents the message length. P represents the number of processes that belong to a process group that perform the communication. B represents the bisection bandwidth. The bisection bandwidth represents the lower limit of the communication performance that can be achieved as the entire system when all the calculation nodes in the system perform the maximum communication. α represents a coefficient indicating the effective communication performance.

The collective communication latency $L_{collective}$ is evaluated by expression (2).

$$L_{collective} = L_{prepare} + L_{1\text{-}to\text{-}1} \times (P-1) \quad (2)$$

In this expression, $L_{prepare}$ represents fixed time that does not depend on the communication scale. L(1-to-1), which is given as a subscript in expression 2, represents a coefficient indicating the processing time proportional to the number of processes. In an all-to-all communication, since an individual process transmits a message to all the other processes, L(1-to-1) is multiplied by (P−1).

By setting $L_{prepare}$ to 50 microseconds, L(1-to-1) to 0.5 microseconds, and a to approximately 0.6 in expression (1), expression (1) matches the measured values in FIG. 13. If the segmentation size is reduced, the message length is shortened, and the communication efficiency is deteriorated. In addition, if the message length is approximately 100 KB, good communication efficiency is ensured. However, even if the message length is further increased, the communication efficiency is not improved proportionally.

Next, an example of a relationship between a local array size and operation performance will be described.

Figure 14:
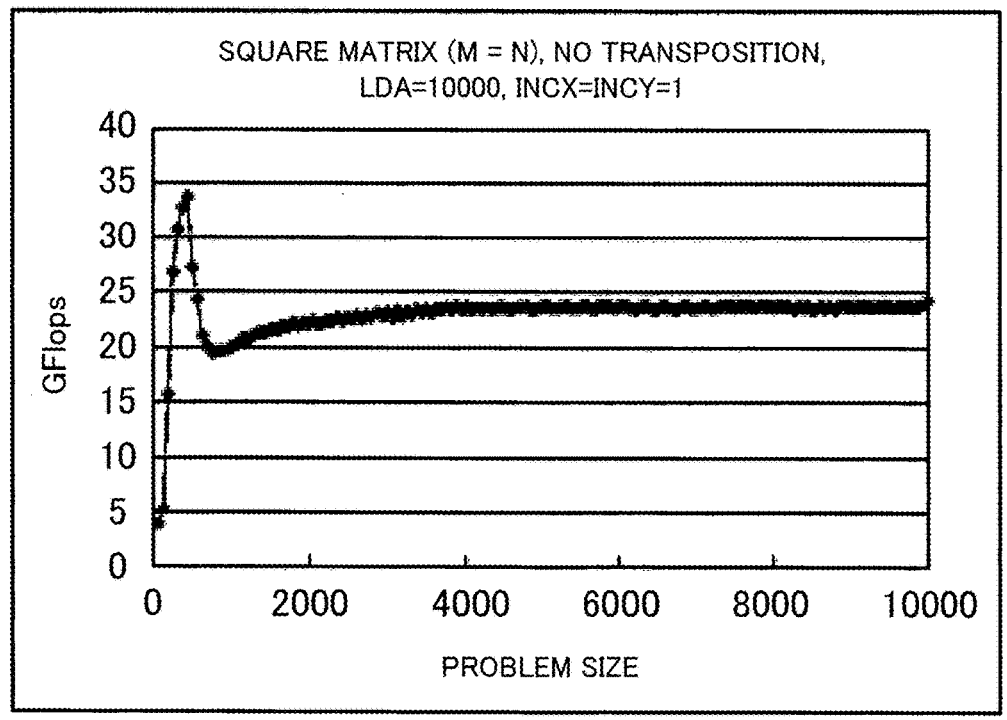
FIG. 14 illustrates an example of a problem size and operation performance based on a complex matrix vector product.

FIG. 14 illustrates an example of a problem size and operation performance based on a complex matrix vector product. In FIG. 14, the problem size corresponds to the size of a local array allocated to a single process (the same is also true in FIG. 15).

Figure 15:
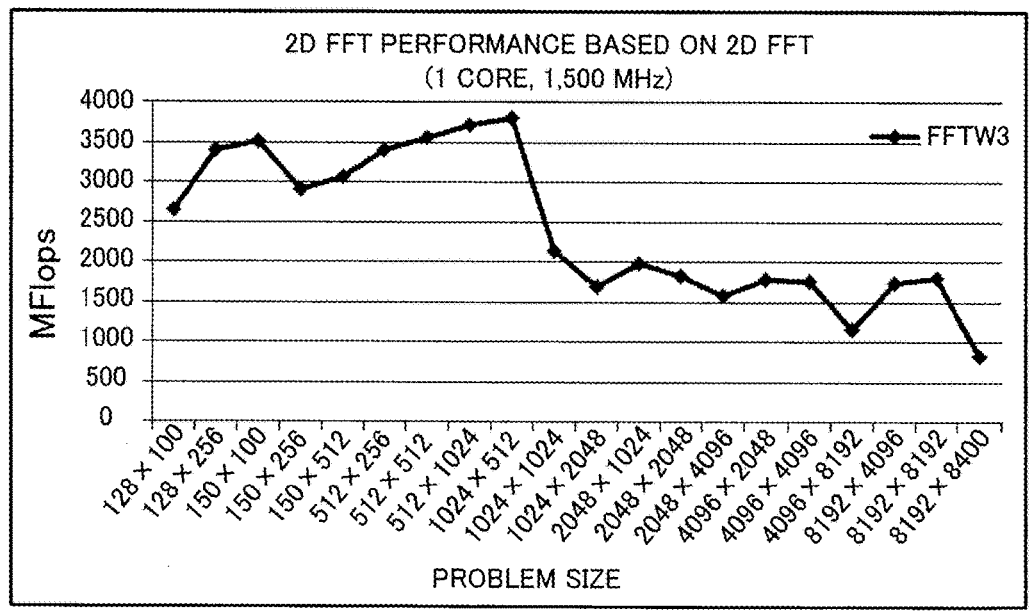
FIG. 15 illustrates an example of a problem size and operation performance based on a 2D FFT.

FIG. 15 illustrates an example of a problem size and operation performance based on a 2D FFT. In either one of the examples in FIGS. 14 and 15, the performance tends to deteriorate when the problem size exceeds the capacity of an L2 cache. This tendency is a performance behavior generally observed in a calculation in which the ratio of data load and data store instructions needed per floating point operation is large. The same tendency is observed in processing performed by an individual process in a distributed and parallel FFT calculation. For this reason, to perform an FFT operation at high speed, it is preferable to adjust the segment size in such a manner that the data access range is maintained within the capacity of an L2 cache and the message length is not shortened to such an extent that the communication performance is deteriorated.

Thus, in an FFT operation, there is a mutual dependence relationship between a communication for moving data needed for the operation and an operation for preparing communication data, and this relationship needs to be considered. There are constraints on the method of segmentation into portions that can be processed independently. If the segmented processing size is excessively large or small, the overall processing efficiency is deteriorated. Thus, it is preferable that the segmentation size be appropriately adjusted.

In addition, the negative impact by an excessively large segment size on the performance can be mitigated by saving the buffer areas used in an algorithm. Thus, an algorithm that needs a smaller memory for overlapping an operation and a communication is demanded.

The parallel computer 50 simultaneously performs two streams in a parallel manner while satisfying the dependency and sequence relationship of the data used in segmented operation and communication processing. The parallel computer 50 controls the execution timings of these two streams so that an operation performed in one stream and a communication performed in the other stream will overlap with each other. In addition, when performing these two streams, the parallel computer 50 causes the two streams to share buffer areas while preventing a conflict of the use of the buffer areas. In this way, the parallel computer 50 achieves memory saving. Namely, the parallel computer 50 realizes fast processing by appropriately adjusting the segment size.

Figure 16:
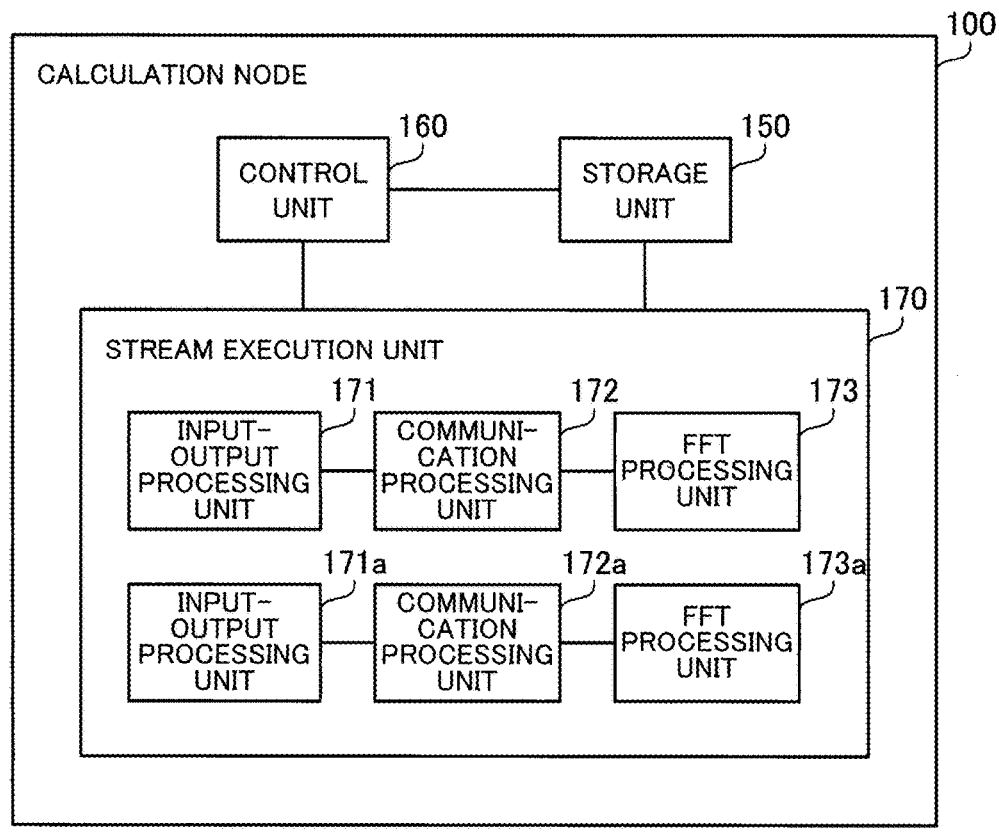
FIG. 16 illustrates a functional example of a calculation node.

FIG. 16 illustrates a functional example of a calculation node 100. The calculation node 100 includes a storage unit 150, a control unit 160 and a stream execution unit 170. While functions of the CPU 110 will be described in the example in FIG. 16, the CPU 120 has the equivalent functions.

The storage unit 150 is realized as a storage area in the cache 111 or the RAM 130. The control unit 160 and the stream execution unit 170 are realized by causing the CPU 110 to perform programs stored in the RAM 130.

The control unit 160 acquires local arrays and determines a segment size. The control unit 160 stores information about the local arrays and the segment size in the storage unit 150.

The stream execution unit 170 performs the above two streams. The stream execution unit 170 includes input-output processing units 171 and 171a, communication processing units 172 and 172a, and FFT processing units 173 and 173a. To perform the two streams in a parallel manner, the stream execution unit 170 includes two input-output processing units, two communication processing units, and two FFT processing units. The input-output processing units 171 and 171a and the communication processing units 172 and 172a are realized by the control core 112. The FFT processing units 173 and 173a are realized by the calculation cores 113 to 117.

The input-output processing unit 171 extracts a data segment, on which an FFT operation is to be performed, from a local array and stores the extracted data segment in a transmission buffer (transposition-in). In addition, the input-output processing unit 171 extracts a data segment, on which an FFT calculation has been performed, from a reception buffer and stores the data segment in the corresponding local array (transposition-out). The input-output processing unit 171a also performs the like processing on data segments different from the data segments handled by the input-output processing unit 171.

The communication processing unit 172 performs an all-to-all communication on a data segment and a data segment on which an FFT operation has been performed. The communication processing unit 172a also performs an all-to-all communication on data segments different from the data segments handled by the communication processing unit 172.

The FFT processing unit 173 performs an FFT operation on a data segment received through an all-to-all communication. The FFT processing unit 173a also performs an FFT operation on data segments different from the data segments handled by the FFT processing unit 173.

Figure 17:
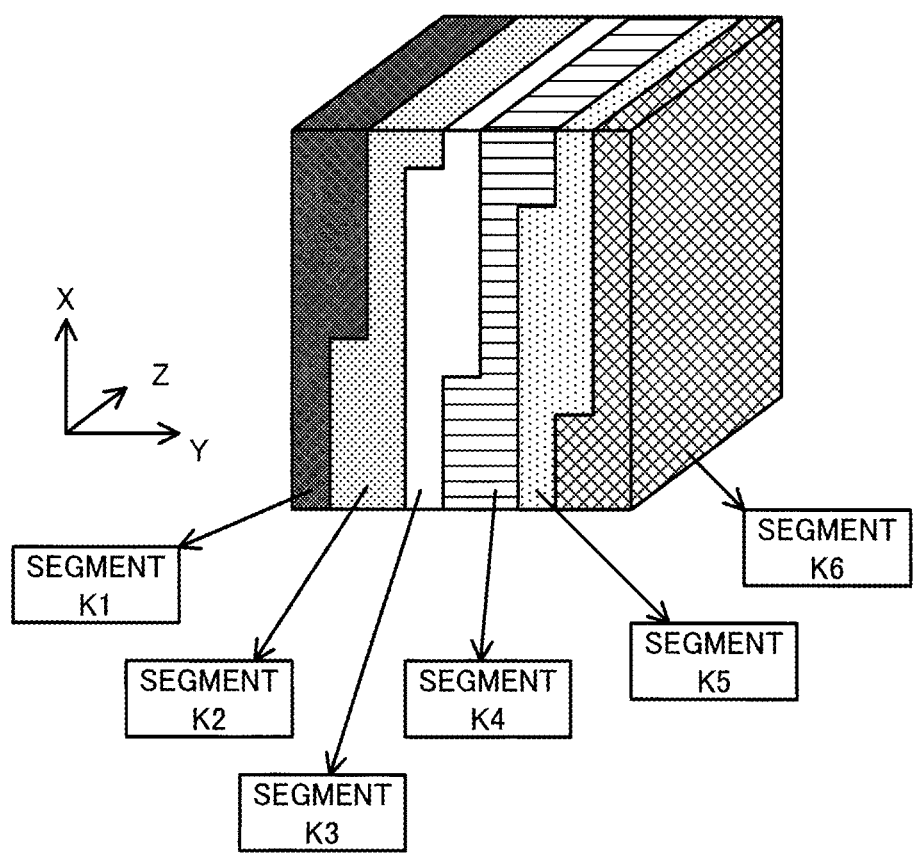
FIG. 17 illustrates an example of segmentation.

FIG. 17 illustrates an example of segmentation. FIG. 17 illustrates an example of segmentation of a local array in the Z direction. For example, the input-output processing units 171 and 171a divide a local array allocated to a single process into six data segments and loads an individual segment in a transmission buffer. The division number is determined on the basis of the segment size (the size of a single data segment). The six data segments will be referred to as segments K1 to K6, respectively.

FIG. 18 illustrates an example of streams according to the second embodiment. The calculation node 100 processes two consecutive data segments (two segments K1 and K2, two segments K2 and K3, etc.) in an overlapping manner by using the two streams R1 and R2. Each of the streams R1 and R2 sequentially performs transposition-in, transmission, reception, FFT, transmission, reception, and transposition-out.

In the transposition-in, the input-output processing unit 171 extracts a data segment from the local array, transposes the data segment to be transmitted (so that the data segment is consecutively arranged along the FFT processing target axis), and stores the data segment in a buffer. The next transmission and reception is an all-to-all communication in which an individual process transmits the result of the transposition-in to the other processes that belong to its own process group. In the FFT, an individual process performs an FFT operation on the result received in the previous all-to-all communication. The next transmission and reception is an all-to-all communication in which an individual process returns the result of its FFT operation to the other corresponding processes. The transposition-out is processing for storing the result received through the previous all-to-all communication in the local array.

Figure 19:
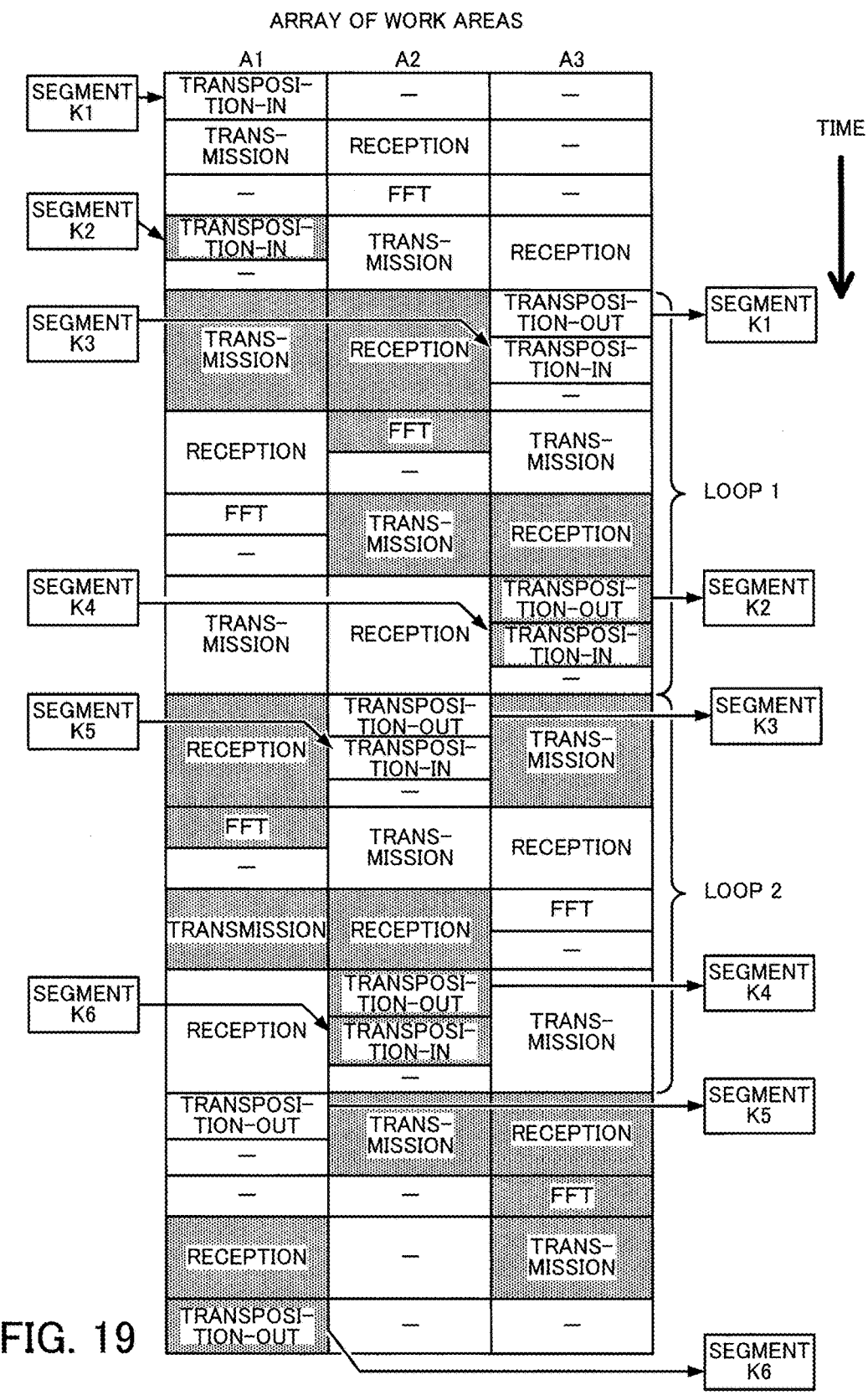
FIG. 19 illustrates an example of overlapping of an operation and a communication according to the second embodiment.

FIG. 19 illustrates an example of overlapping of an operation and a communication according to the second embodiment. The stream execution unit 170 provides work areas A1 to A3, which are three storage areas, in the storage unit 150 for the two stream R1 and R2. The stream execution unit 170 performs each of the two streams R1 and R2 by using the work areas A1 to A3 as follows. FIG. 19 illustrates an example in which a Z-direction FFT is performed on each of the data segments illustrated in FIG. 17. The passage of time is indicated by an arrow pointing down in FIG. 19. In FIG. 19, the processing corresponding to the stream R2 is indicated by shaded areas, and a hyphen "-" denotes a period in which no processing is performed by using the corresponding storage area.

At timing 1, the input-output processing unit 171 extracts the segment K1 from the local array, performs transposition-in processing, and stores the transposed segment K1 in the work area A1.

At timing 2, the communication processing unit 172 performs an all-to-all communication by using the work area A1 (transmission buffer) and the work area A2 (reception buffer).

At timing 3, the FFT processing unit 173 performs an FFT operation on the data received through the all-to-all communication and stored in the work area A2.

At timing 4, the communication processing unit 172 performs an all-to-all communication of an individual FFT operation result, by using the work area A2 (transmission buffer) and the work area A3 (reception buffer).

In addition, at timing 4, the input-output processing unit 171a extracts the segment K2 from the local array, performs transposition-in processing, and stores the transposed segment K2 in the work area A1. The procedure indicated by timing t1 to timing t4 is the pre-processing performed before the following loop processing.

At timing 5, the input-output processing unit 171 performs transposition-out processing on the data received through the all-to-all communication and stored in the work area A3 and stores the transposed data in the corresponding original location in the local array. In addition, the input-output processing unit 171 extracts the segment K3 from the local array, performs transposition-in processing, and stores the transposed segment K3 in the work area A3. In addition, at timing 5, the communication processing unit 172a performs an all-to-all communication by using the work area A1 (transmission buffer) and the work area A2 (reception buffer).

At timing 6, the communication processing unit 172 performs an all-to-all communication by using the work area A3 (transmission buffer) and the work area A1 (reception buffer). In addition, at timing 6, the FFT processing unit 173a performs an FFT operation on the data received through the all-to-all communication and stored in the work area A2.

At timing 7, the FFT processing unit 173 performs an FFT operation on the data received through the all-to-all communication and stored in the work area A1. In addition, at timing 7, the communication processing unit 172a performs an all-to-all communication of an individual FFT operation result by using the work area A2 (transmission buffer) and the work area A3 (reception buffer).

At timing 8, the communication processing unit 172 performs an all-to-all communication of an individual FFT operation result by using the work area A1 (transmission buffer) and the work area A2 (reception buffer). In addition, at timing 8, the input-output processing unit 171a performs transposition-out processing to transpose and store the data, received through the all-to-all communication and stored in the work area A3, in the corresponding original location in the local array. In addition, the input-output processing unit 171a extracts the segment K4 from the local array, performs transposition-in processing, and stores the transposed segment K4 in the work area A3. The first loop processing is performed in accordance with the procedure indicated by timing 5 to timing 8.

At timing 9, the input-output processing unit 171 performs transposition-out processing to transpose and store the data, received through the all-to-all communication and stored in the work area A2, in the corresponding original location in the local array. In addition, the input-output processing unit 171 extracts the segment K5 from the local array, performs transposition-in processing, and stores the transposed segment K5 in the work area A2. In addition, at timing 9, the communication processing unit 172*a* performs an all-to-all communication by using the work area A3 (transmission buffer) and the work area A1 (reception buffer).

At timing 10, the communication processing unit 172 performs an all-to-all communication by using the work area A2 (transmission buffer) and the work area A3 (reception buffer). In addition, at timing 10, the FFT processing unit 173*a* performs an FFT operation on the data received through the all-to-all communication and stored in the work area A1.

Next, at timing 11, the FFT processing unit 173 performs an FFT operation on the data received through the all-to-all communication and stored in the work area A3. In addition, at timing 11, the communication processing unit 172*a* performs an all-to-all communication of an individual FFT operation result by using the work area A1 (transmission buffer) and the work area A2 (reception buffer).

Next, at timing 12, the communication processing unit 172 performs an all-to-all communication of an individual FFT operation result by using the work area A3 (transmission buffer) and the work area A1 (reception buffer). In addition, at timing 12, the input-output processing unit 171*a* performs transposition-out processing to transpose and store the data, received through the all-to-all communication and stored in the work area A2, in the corresponding original location in the local array. In addition, the input-output processing unit 171*a* extracts the segment K6 from the local array, performs transposition-in processing, and stores the transposed segment K6 in the work area A2. The second loop processing (loop 2) is performed in accordance with the procedure indicated by timing 6 to timing 12. Hereinafter, a loop termination procedure will be described.

At timing 13, the input-output processing unit 171 performs transposition-out processing to transpose and store the data, received through the all-to-all communication and stored in the work area A2, in the corresponding original location in the local array (completion of the stream R1). In addition, at timing 13, the communication processing unit 172*a* performs an all-to-all communication by using the work area A2 (transmission buffer) and the work area A3 (reception buffer).

Next, at timing 14, the FFT processing unit 173*a* performs an FFT operation on the data received through the all-to-all communication and stored in the work area A3.

Next, at timing 15, the communication processing unit 172*a* performs an all-to-all communication of an individual FFT operation result by using the work area A3 (transmission buffer) and the work area A1 (reception buffer).

Next, at timing 16, the input-output processing unit 171*a* performs transposition-out processing to transpose and store the data, received through the all-to-all communication and stored in the work area A1, in the corresponding original location in the local array (completion of the stream R2).

Next, a specific procedure of the FFT processing performed by using the above three work areas will be described. First, a procedure of overall FFT processing will be described.

Figure 20:
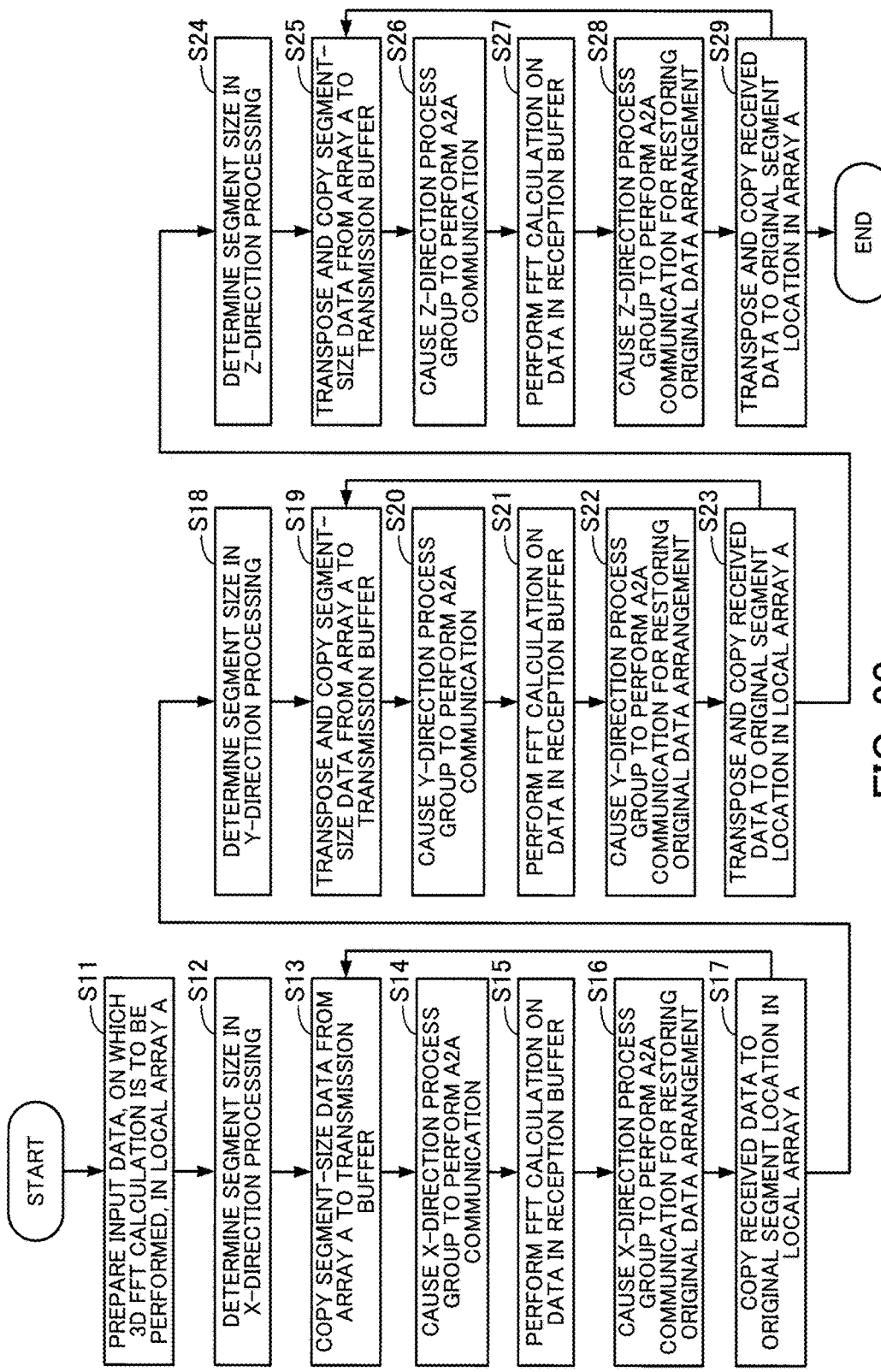
FIG. 20 is a flowchart illustrating an example of overall FFT processing according to the second embodiment.

FIG. 20 is a flowchart illustrating an example of overall FFT processing according to the second embodiment. The processing illustrated in FIG. 20 will be described step by step.

(S11) The control unit 160 prepares input data, on which a 3D FFT calculation is to be performed, in a local array A.

(S12) The control unit 160 determines a segment size in the X-direction processing. A method of determining the segment size will be described in detail below.

(S13) The stream execution unit 170 copies segment-size data from the local array A to a transmission buffer.

(S14) The stream execution unit 170 causes an X-direction process group to perform an all-to-all communication. An all-to-all communication is denoted as "A2A communication" in FIG. 20.

(S15) The stream execution unit 170 performs an FFT calculation on the data in the reception buffer.

(S16) The stream execution unit 170 causes the X-direction process group to perform an all-to-all communication for restoring the original data arrangement.

(S17) The stream execution unit 170 copies the received data to the original segment location in the local array A. The stream execution unit 170 repeats the procedure indicated by steps S13 to S17 by using the two streams as illustrated in FIG. 19. Next, after the calculation node 100 performs the X-direction FFT processing, the control unit 160 performs step S18.

(S18) The control unit 160 determines a segment size in the Y-direction processing.

(S19) The stream execution unit 170 transposes and copies segment-size data from the local array A to a transmission buffer (transposition-in).

(S20) The stream execution unit 170 causes a Y-direction process group to perform an all-to-all communication.

(S21) The stream execution unit 170 perform an FFT calculation on the data in the reception buffer.

(S22) The stream execution unit 170 causes the Y-direction process group to perform an all-to-all communication for restoring the original data arrangement.

(S23) The stream execution unit 170 transposes and copies the received data to the original segment location in the local array A (transposition-out). The stream execution unit 170 repeats the procedure indicated by steps S19 to S23 by using the two streams as illustrated in FIG. 19. Next, after the calculation node 100 performs the Y-direction FFT processing, the control unit 160 performs step S24.

(S24) The control unit 160 determines a segment size in the Z-direction processing.

(S25) The stream execution unit 170 transposes and copies segment-size data from the local array A to a transmission buffer (transposition-in).

(S26) The stream execution unit 170 causes a Z-direction process group to perform an all-to-all communication.

(S27) The stream execution unit 170 performs an FFT calculation on the data in the reception buffer.

(S28) The stream execution unit 170 causes the Z-direction process group to perform an all-to-all communication for restoring the original data arrangement.

(S29) The stream execution unit 170 transposes and copies the received data to the original segment location in the local array A (transposition-out). The stream execution unit 170 repeats the procedure indicated by steps S25 to S29 by using the two streams as illustrated in FIG. 19. Upon completion of the Z-direction FFT processing, the stream execution unit 170 ends the present processing.

Figure 21:
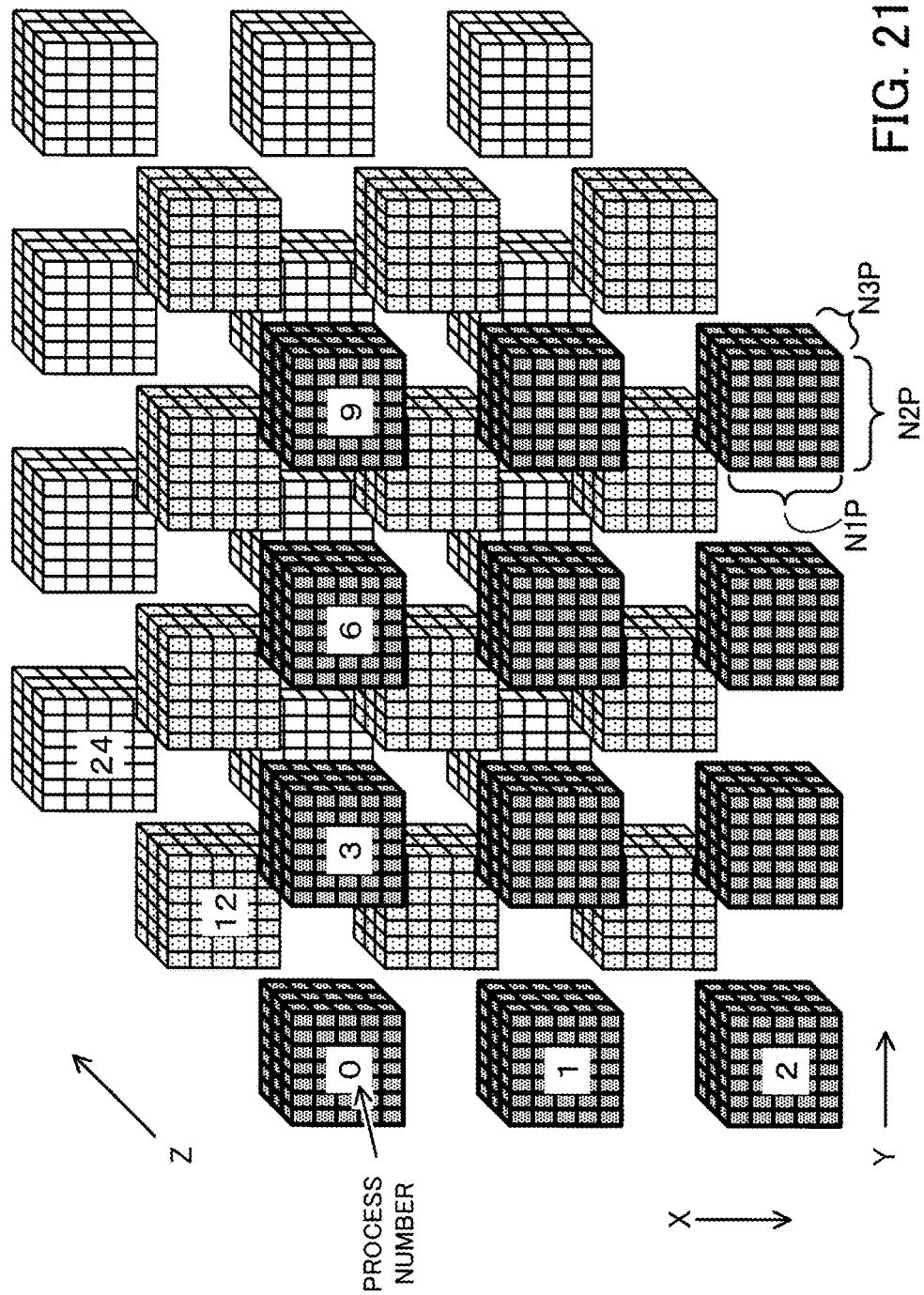
FIG. 21 illustrates an example of input data divided according to process.

FIG. 21 illustrates an example of input data divided according to process. FIG. 21 illustrates an example in which a global array is divided into local arrays in a process shape of 3×4×3. In this process shape, individual processes are identified by their respective process numbers such as "0," "1," and "2" in the X-axis direction, "0," "3," "6," and "9" in the Y-axis direction, and "0," "12," and "24" in the Z-axis direction. If the size of the global array is represented by N1, N2, and N3 and the division numbers in the X, Y, and Z-axis directions are P1, P2, P3, respectively, the size of a local array is represented by N1P=N1/P1, N2P=N2/P2, and N3P=N3/P3.

Figure 22:
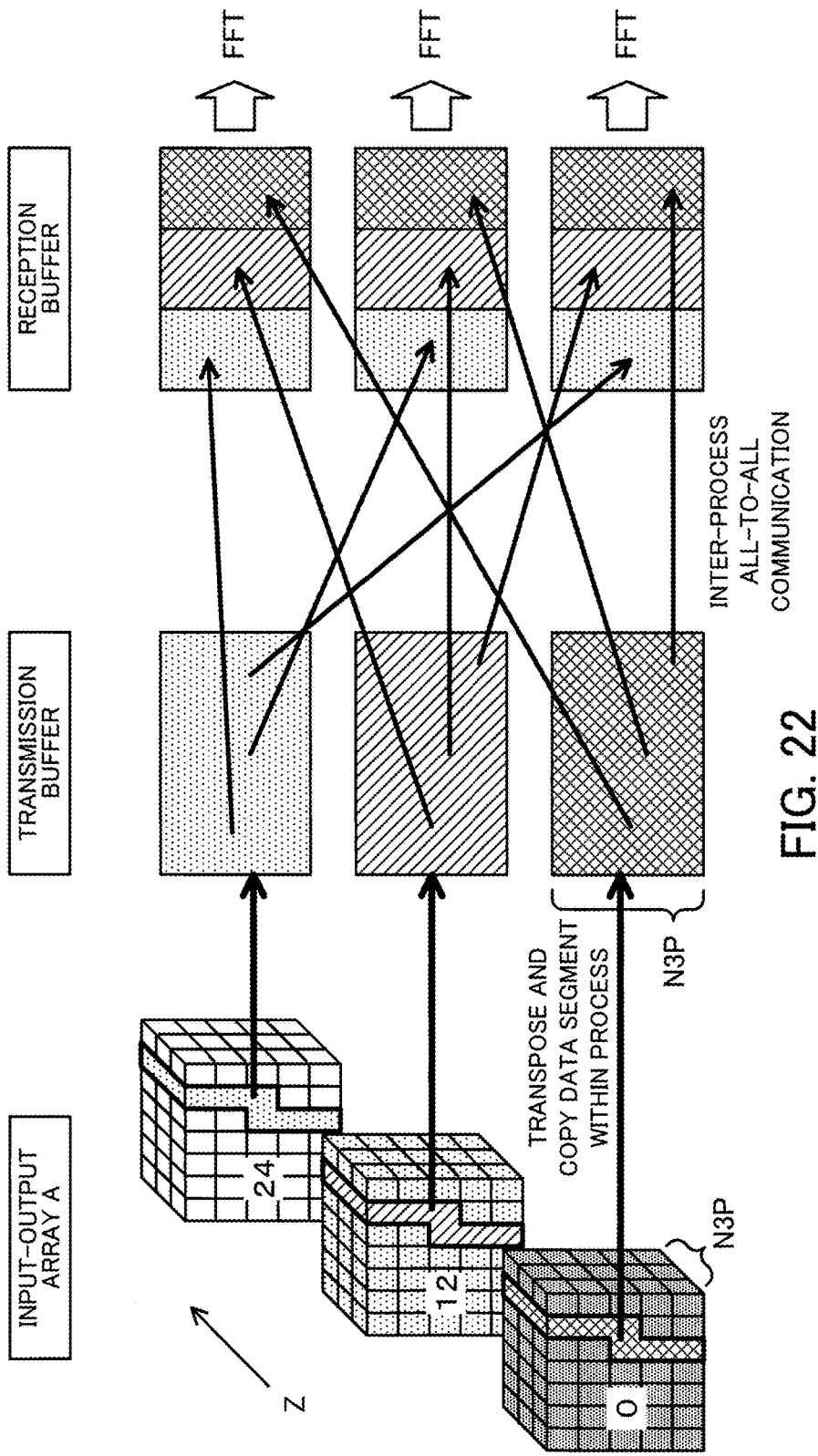
FIG. 22 illustrates the first half of an example of transposition and copy of an individual segment and an inter-process communication.

FIG. 22 illustrates the first half of an example of transposition and copy of an individual segment and an inter-process communication. FIG. 22 illustrates an example of how a single process group in the Z direction (a process group to which the processes having their respective process numbers "0," "12," and "24" belong) transposes and copies data segments (transposition-in) and performs an inter-process all-to-all communication.

Figure 23:
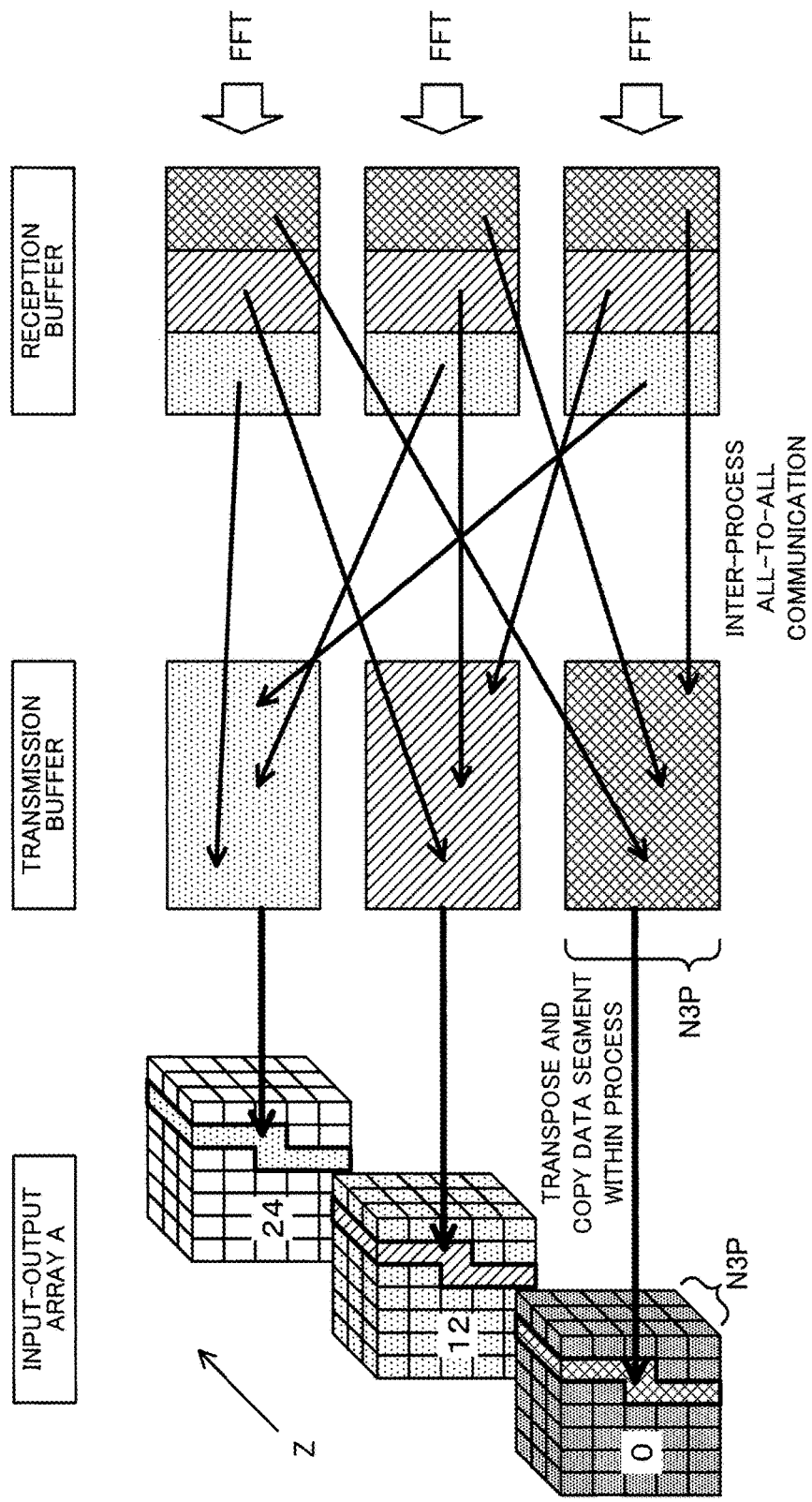
FIG. 23 illustrates the second half of the example of transposition and copy of an individual segment and an inter-process communication.

FIG. 23 illustrates the second half of the example of transposition and copy of an individual segment and an inter-process communication. After an individual process performs a multiple FFT calculation on the data segment stored in a reception buffer received through the all-to-all communication illustrated in FIG. 22, the data segment flows in the reverse direction. Consequently, an individual process transposes and copies the data segment to the original segment location in the local array (input-output array) A (transposition-out). While an example of the Z-direction FFT calculation is illustrated in FIGS. 22 and 23, the FFT calculations in the X and Y directions are also performed in the like manner.

Next, a procedure of an FFT calculation in an individual axis direction in the overall FFT processing illustrated in FIG. 20 will be described. While there are three kinds of direction in 3D, namely, the X, Y, and Z directions, the following description will be made with a focus on the Z direction. As in the Z direction, like processing may be performed in the X and Y directions.

Figure 24:
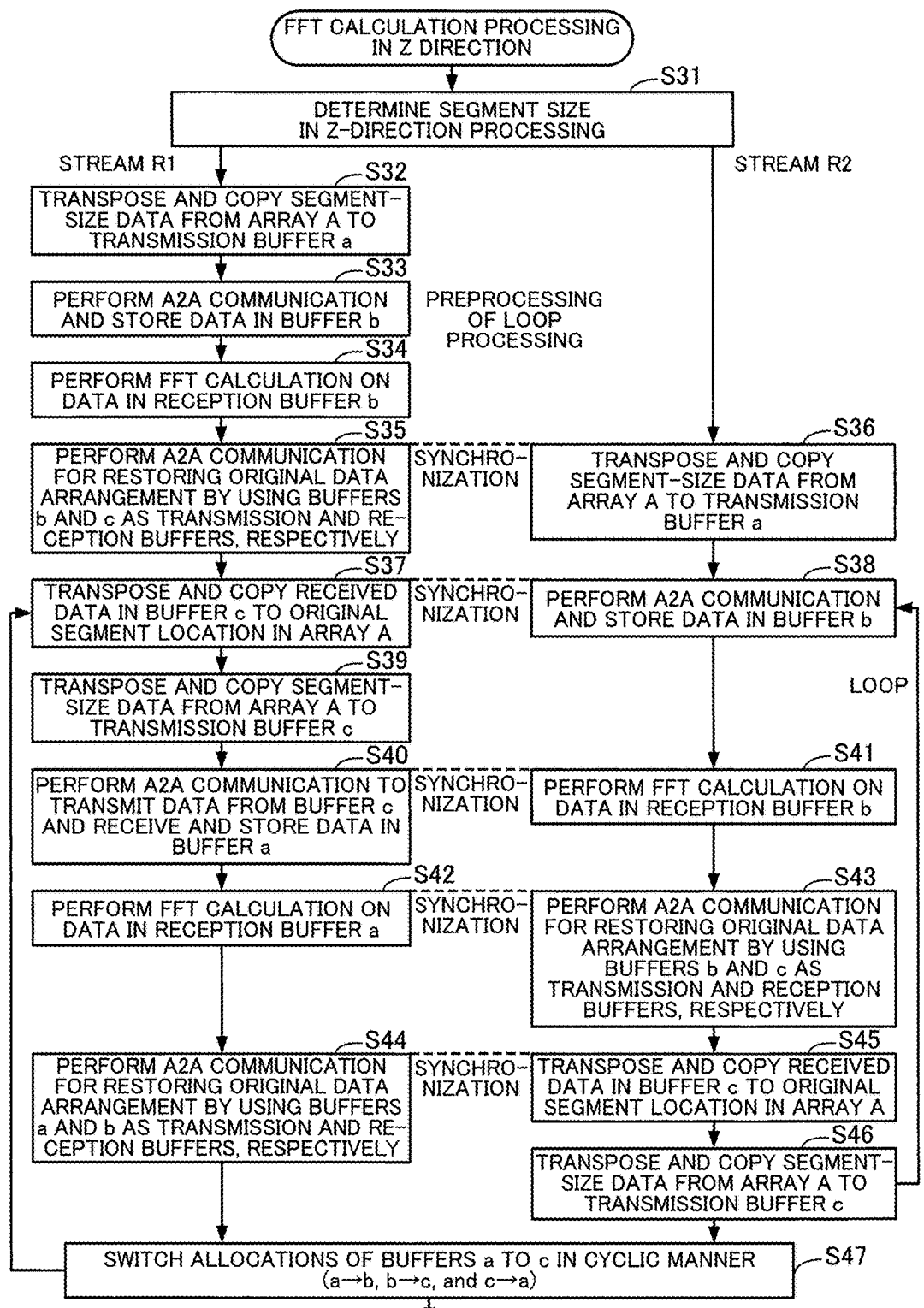
FIG. 24 is the first half of a flowchart illustrating an example of a Z-direction FFT calculation according to the second embodiment.

FIG. 24 is the first half of a flowchart illustrating an example of a Z-direction FFT calculation according to the second embodiment. Hereinafter, the processing illustrated in FIG. 24 will be described step by step. The following procedure corresponds to steps S24 to S29 in FIG. 20. The input-output processing unit 171, the communication processing unit 172, and the FFT processing unit 173 perform the processing in the stream R1. The input-output processing unit 171a, the communication processing unit 172a, and the FFT processing unit 173a perform the processing in the stream R2.

(S31) The control unit 160 determines a segment size in the Z-direction processing.

(S32) The input-output processing unit 171 transposes and copies segment-size data from the local array A to a transmission buffer a (transposition-in). Each of the work areas A1 to A3 is allocated to any one of buffers a, b, and c. In an initial state, the buffers a to c correspond to the work areas A1 to A3, respectively. Note that the use of each of the buffers a to c is switched to serve as a transmission buffer, a reception buffer, etc. in the following description. Hereinafter, the use of an individual buffer at an individual timing will be clarified. For example, the buffer a will be referred to as a "transmission buffer a" at a certain timing and as a "reception buffer a" at another timing, as needed.

(S33) The communication processing unit 172 performs an all-to-all communication and receives and stores data in the buffer b.

(S34) The FFT processing unit 173 performs an FFT calculation on the data in the reception buffer b.

(S35) The communication processing unit 172 performs an all-to-all communication for restoring the original data arrangement by using the buffer b as a transmission buffer and the buffer c as a reception buffer.

(S36) The input-output processing unit 171a transposes and copies segment-size data from the local array A to the transmission buffer a (transposition-in). The communication processing unit 172 and the input-output processing unit 171a perform steps S35 and S36 in synchronization with each other. Steps S31 to S36 correspond to the pre-processing of the loop processing.

(S37) The input-output processing unit 171 transposes and copies the received data in the buffer c to the original segment location in the local array A (transposition-out).

(S38) The communication processing unit 172a performs an all-to-all communication and receives and stores data in the buffer b. The input-output processing unit 171 and the communication processing unit 172a perform steps S37 and S38 in synchronization with each other.

(S39) The input-output processing unit 171a transposes and copies segment-size data from the local array A to the transmission buffer c (transposition-in).

(S40) The communication processing unit 172 performs an all-to-all communication to transmit the data from the buffer c and to receive and store data in the buffer a.

(S41) The FFT processing unit 173a performs an FFT calculation on the data in the reception buffer b. The communication processing unit 172 and the FFT processing unit 173a perform steps S40 and S41 in synchronization with each other.

(S42) The FFT processing unit 173 performs an FFT calculation on the data in the reception buffer a.

(S43) The communication processing unit 172a performs an all-to-all communication for restoring the original data arrangement by using the buffer b as a transmission buffer and the buffer c as a reception buffer. The FFT processing unit 173 and the communication processing unit 172a perform steps S42 and S43 in synchronization with each other.

(S44) The communication processing unit 172 performs an all-to-all communication for restoring the original data arrangement by using the buffer a as a transmission buffer and the buffer b as a reception buffer.

(S45) The input-output processing unit 171a transposes and copies the received data in the buffer c to the original segment location in the local array (transposition-out). The communication processing unit 172 and the input-output processing unit 171a perform steps S44 and S45 in synchronization with each other.

(S46) The input-output processing unit 171a transposes and copies segment-size data from the local array A to the transmission buffer c (transposition-in).

(S47) The input-output processing units 171 and 171a switch the allocations of the buffers a to c in a cyclic manner. Specifically, the work area corresponding to the buffer a is changed to serve as the buffer b. The work area corresponding to the buffer b is changed to serve as the buffer c. The work area corresponding to the buffer c is changed to serve as the buffer a. The processing in the stream R1 returns to step S37 and the processing in the stream R2 returns to step S38 until all the data segments are processed. When all the data segments in the local array A are processed, the input-output processing unit 171 performs step S48.

Figure 25:
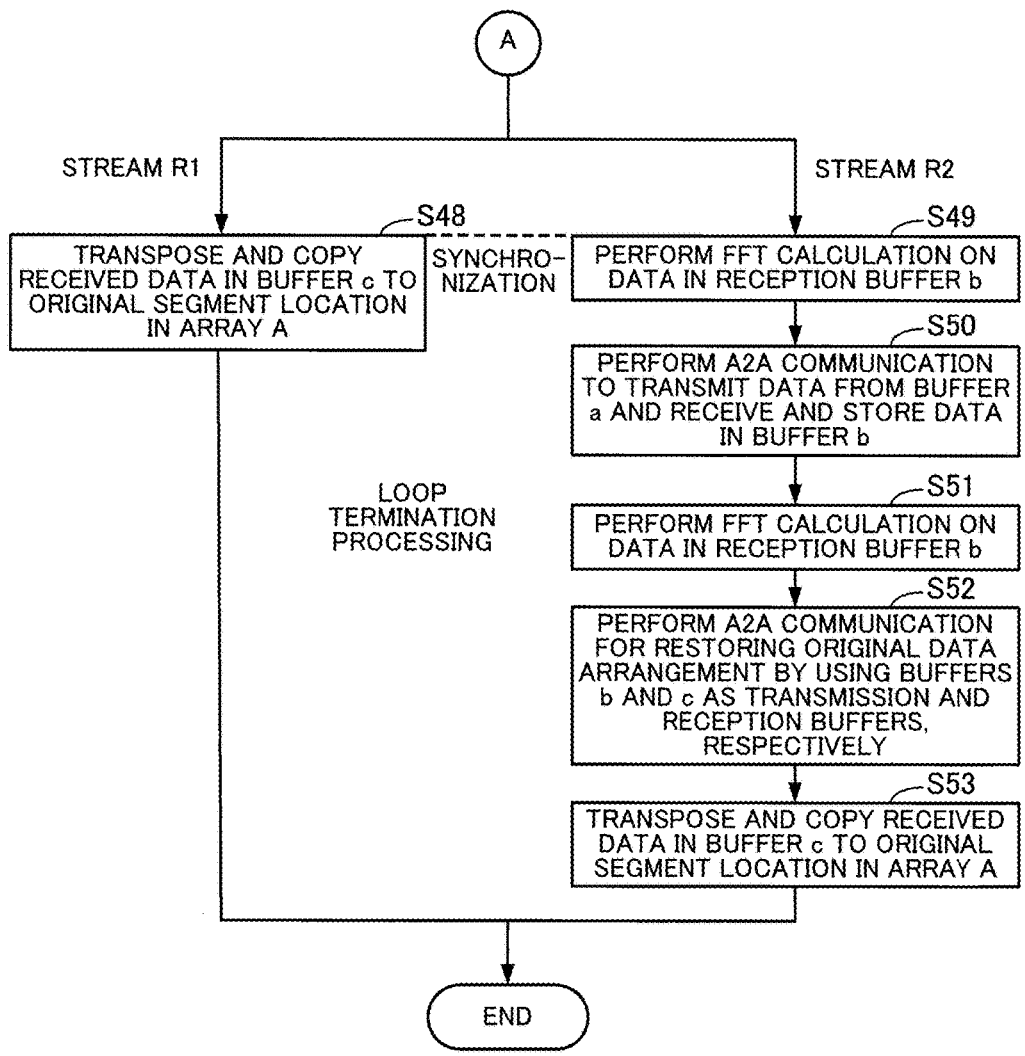
FIG. 25 is the second half of the flowchart illustrating an example of a Z-direction FFT calculation according to the second embodiment.

FIG. 25 is the second half of the flowchart illustrating an example of a Z-direction FFT calculation according to the second embodiment. The processing illustrated in FIG. 25 will be described step by step.

(S48) The input-output processing unit 171 transposes and copies the received data in the buffer c to the original segment location in the local array A (transposition-out). Thus, the stream R1 is completed.

(S49) The FFT processing unit 173a performs an FFT calculation on the data in the reception buffer b. The input-output processing unit 171 and the FFT processing unit 173a perform steps S48 and S49 in synchronization with each other.

(S50) The communication processing unit 172a performs an all-to-all communication to transmit the data from the buffer a and receive and store data in the buffer b.

(S51) The FFT processing unit 173a performs an FFT calculation on the data in the reception buffer b.

(S52) The communication processing unit 172a performs an all-to-all communication for restoring the original data arrangement by using the buffer b as a transmission buffer and the buffer c as a reception buffer.

(S53) The input-output processing unit 171a transposes and copies the received data in the buffer c to the original segment location in the local array A. Thus, the stream R2 is completed. Steps S48 to S53 correspond to the loop termination processing. Thus, the Z-direction FFT calculation processing is completed.

Since there is no data dependency relationship between the FFT procedure on one segment and the FFT procedure on another segment, the segments can be processed independently. Thus, by preparing two streams as described above and overlapping one stream with the other stream, overlapping of an operation and a communication is enabled. While there is no data dependency relationship between two segments to be processed, by performing synchronization processing for avoiding writing of different data in a transmission buffer being used for communication processing or avoiding reference to a reception buffer being used for communication processing, conflict of a currently used buffer is avoided. In this way, by sharing the work area buffers while avoiding a conflict, the buffer size needed for the two streams can be limited to three times the size of a segment in the local array A. Thus, memory saving can be achieved.

To implement the procedure illustrated in FIGS. 24 and 25, for example, a non-blocking collective communication (MPI_alltoall) in the MPI 3.0 standard may be used. Alternatively, the procedure illustrated in FIGS. 24 and 25 may be implemented in such a manner that only one thread clearly controls the communication processing and another thread clearly controls the operation processing. In the latter case, in the case of the implementation based on the MPI standard, the threads need to comply with "MPI_THREAD_FUNNELED" or "MPI_THREAD_SERIALIEZED" as the thread support level. In addition, about the collective communication function, it is desirable that implementation of an MPI library optimized for the system used be performed in advance. However, the above method does not necessarily need implementation of a certain MPI library. The above method is applicable in any environment in which an operation and an all-to-all communication can be overlapped with each other.

Next, a procedure of segment size determination processing will be described.

Figure 26:
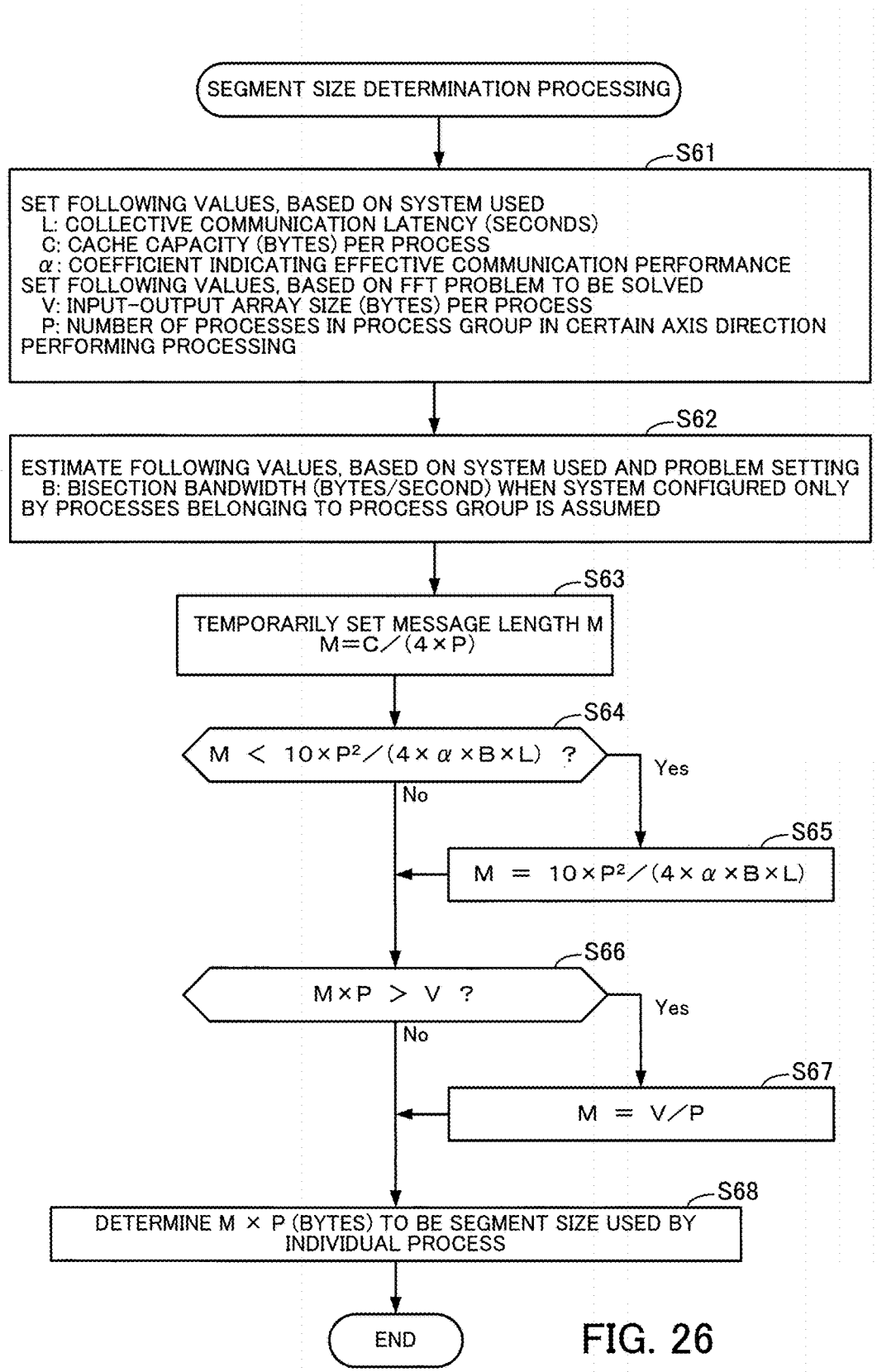
FIG. 26 is a flowchart illustrating an example of segment size determination processing according to the second embodiment.

FIG. 26 is a flowchart illustrating an example of segment size determination processing according to the second embodiment. The processing illustrated in FIG. 26 will hereinafter be described step by step. The following procedure corresponds to steps S12, S18, and S24 in FIG. 20 and step S31 in FIG. 24 (steps S31 and S24 represent the same processing).

(S61) The control unit 160 sets values L, C, and $\alpha$, based on the system used (for example, the hardware or communication environment of the parallel computer 50). L represents the collective communication latency (seconds). C represents the cache capacity (bytes) per process. $\alpha$ represents a coefficient indicating the effective communication performance. In addition, the control unit 160 sets values V and P, based on the FFT problem to be solved. V represents the input-output array size (bytes) per process. P represents the number of processes in a process group in a certain dimension direction performing processing.

(S62) The control unit 160 estimates a value B, based on the system used and the problem setting. B represents the bisection bandwidth (bytes/second) when a system configured only by the processes belonging to a single process group is assumed. Namely, B represents the bisection bandwidth of communication paths among a plurality of calculation nodes on which a plurality of processes that perform a collective communication operate. For example, in the case of Tofu, which is a 6D mesh/torus, B can be approximated as follows assuming that the bandwidth per link between calculation nodes is $B_L$ and the number of process per axis direction is Pi. In the case of uniaxial distribution, B can be calculated by expression (3).

$$B = 4 \times B_L \times \prod_{i \neq argmax(Pi)} Pi \qquad (3)$$

In the case of biaxial distribution, B can be calculated by expression (4).

$$B = 2 \times B_L \times \sqrt{\prod_{i=1\sim3} Pi} \qquad (4)$$

In the case of triaxial distribution, B can be calculated by expression (5).

$$B = 2 \times B_L \qquad (5)$$

(S63) The control unit 160 temporarily sets a message length M (M=C/(4×P)).

(S64) The control unit 160 determines whether M is smaller than $10 \times P^2/(4 \times \alpha \times B \times L)$. If M is smaller than $10 \times P^2/(4 \times \alpha \times B \times L)$, the processing proceeds to step S65. If not, the processing proceeds to step S66.

(S65) The control unit 160 sets M to $10 \times P^2/(4 \times \alpha \times B \times L)$. Next, the processing proceeds to step S66.

(S66) The control unit 160 determines whether M×P is larger than V. If M×P is larger than V, the processing proceeds to step S67. If not, the processing proceeds to step S68.

(S67) The control unit 160 sets M to V/P. Next, the processing proceeds to step S68.

(S68) The control unit 160 determines M×P (bytes) to be the segment size used by an individual process. In this way, the segment size determination processing is completed. The stream execution unit 170 performs the FFT processing in an individual axis direction by using the segment size determined in the above way.

In this way, the control unit 160 determines the segment size. Regarding an appropriate segment size, there is a trade-off in performance behavior from the viewpoints of the operation and the communication. While an excessively large segment size could decrease the operation performance by half, an excessively small segment size could affect the communication performance many times over. Thus, the control unit 160 gives greater importance to the impact on the communication performance and determines the segment size in accordance with the following priority order.

The first condition is M×P≤N1P×N2P×N3P×(byte number per element). The second condition is $L_{collective} \ll M \times P^2/(4 \times \alpha \times B)$. The third condition is 4×M×P≅(cache capacity per process).

In the above conditions, M represents the message length (bytes), and the segment size is determined in such a manner that 3×M×P is the work area size (the total size of the work areas A1 to A3). The first condition indicates the upper-limit size so that transmission and reception buffers larger than an input-output array are not needed. The cache capacity per process is the capacity of a cache memory (for example, the cache 111) that can be allocated to a certain process as the work areas A1 to A3. The communication latency $L_{collective}$, the communication efficiency coefficient α, the cache capacity per process are parameters to which values depending on the system can be given. The process P (any one of P1 to P3) in an individual axis direction can determine these parameters when performing the present processing. Under the third condition (corresponding to step S63), the control unit 160 determines the inter-process communication message length on the basis of the capacity of the cache memory and determines the size (segment size) of data to be processed by each of a plurality of processes on the basis of the determined message length. When determining the message length, the control unit 160 also takes the parameter B into consideration.

The parameter B is an index indicating the communication performance of a process group performing a collective communication and is the bisection bandwidth in the system configured only by the processes belonging to the process group. In a distributed parallel FFT based on a multiaxial distribution technique, there is a calculation process in which the entire process is divided into a plurality of process groups and each of the process groups performs a collective communication. Thus, this bisection bandwidth is different from that in the entire system in a normal sense. In a multidimensional direct network system, while the value of the parameter B is determined from a communication link band between neighboring processes and a process shape, it is not easy to directly obtain the value of the parameter B. Thus, as described with reference to FIG. 26, the control unit 160 approximates the value of the parameter B in a simple way by using a calculation expression used depending on the use of uniaxial distribution (expression (3)), biaxial distribution (expression (4)), or triaxial distribution (expression (5)). Namely, from the three kinds of calculation expression, the control unit 160 selects a calculation expression for obtaining the bisection bandwidth, depending on which one of uniaxial distribution, biaxial distribution, and triaxial distribution is used. In this way, an appropriate value can be obtained as the parameter B on the basis of the operation method. As a result, the segment size can be determined appropriately on the basis of the operation method. In addition, it is possible to perform a high-speed FFT operation while achieving memory saving.

FIG. 27 illustrates comparative examples compared with FFT operations according to the second embodiment. In FIG. 27, cases in which a local array is segmented into arbitrary sizes among processes and overlapping of an operation and a communication is performed according to the method of the second embodiment are surrounded by a thick black frame. The other cases are comparative examples in which a global array is simply segmented. In FIG. 27, for each case, a distribution axis, presence of overlapping of an operation and a communication, a work area size, presence of the constraint on the adjustment of the segment size, the constraint level if there is any constraint on the adjustment of the segment size, and an estimate of the message length when the number of all the processes=NP. NS is the number of segments (the number of segments in a local array).

First, because of the segmentation method illustrated in FIGS. 11 and 12, the constraint on adjustment of the segment size is mitigated, the constraint regarding division of processing into blocks each having an appropriate size (while the constraint levels in the comparative examples are high, the constraint levels in the second embodiment are low). However, since the second embodiment uses a single FFT target data size in an individual axis direction as a unit, there is a little constraint. Thus, the segment size can be adjusted, an optimum segment size can be set in view of both the operation efficiency and the communication efficiency. In addition, since it is possible to share buffers while avoiding a conflict, the work area size can be reduced. Namely, memory saving can be achieved. In addition, a faster operation can be performed by increasing the locality of the data access range (for example, access can be made only to the L2 cache).

As described above, when performing a distributed and parallel 3D FFT calculation, the parallel computer 50 according to the second embodiment uses a method that allows division of a local array more freely into segments that can independently be processed. In addition, since two streams share buffers used while avoiding a conflict, the memory used as an array of work areas can be saved, and the cache use efficiency is improved. Consequently, a faster FFT calculation can be performed. In addition, regarding the trade-off relationship between the operation performance and the communication performance, the segment size can appropriately be set by using an appropriate estimation expression for the performance.

In particular, two streams are overlapped with each other (FIG. 19) by using the segmentation method in FIGS. 11 and 12. Thus, the parallel computer 50 achieves memory saving and overlapping of an operation and a communication while satisfying the condition about the order of the data dependency imposed on a 3D FFT calculation algorithm and the condition about the avoidance of a conflict of a buffer used.

Third Embodiment

Next, a third embodiment will be described. The following description will be made on what is different from the above second embodiment, and description of what is common to the above second embodiment will be omitted.

In the second embodiment, an example in which the output data is stored in the same storage format as that of the input data has been described. However, there are cases in which the output data is deemed sufficient as long as the data is accurately arranged when an inverse FFT is performed after processing per element is performed on a forward FFT result. Thus, there are cases in which reduction of the communication amount is achieved by arranging the output data separately (namely, there are cases in which the communication for restoring the original data arrangement is omitted.). In the third embodiment, an example in which the communication for restoring the original data arrangement is omitted will be described.

For example, individual elements of the hardware and the functions of the parallel computer according to the third embodiment are the same as those of the parallel computer 50 according to the second embodiment. Thus, individual elements of the parallel computer according to the third embodiment will be indicated by the same names and reference characters as those in the second embodiment.

FIG. 28 illustrates an example of streams of a forward FFT operation according to the third embodiment. A calculation node 100 processes two consecutive data segments (two segments K1 and K2, two segments K2 and K3, etc.) in an overlapping manner by using two streams R1a and R2a. Each of the streams R1a and R2a sequentially performs transposition-in, transmission, reception, FFT, and transposition-out. The streams R1a and R2a are different from the streams R1 and R2 according to the second embodiment illustrated in FIG. 18 in that the all-to-all communication after the FFT calculation is omitted.

Figure 29:
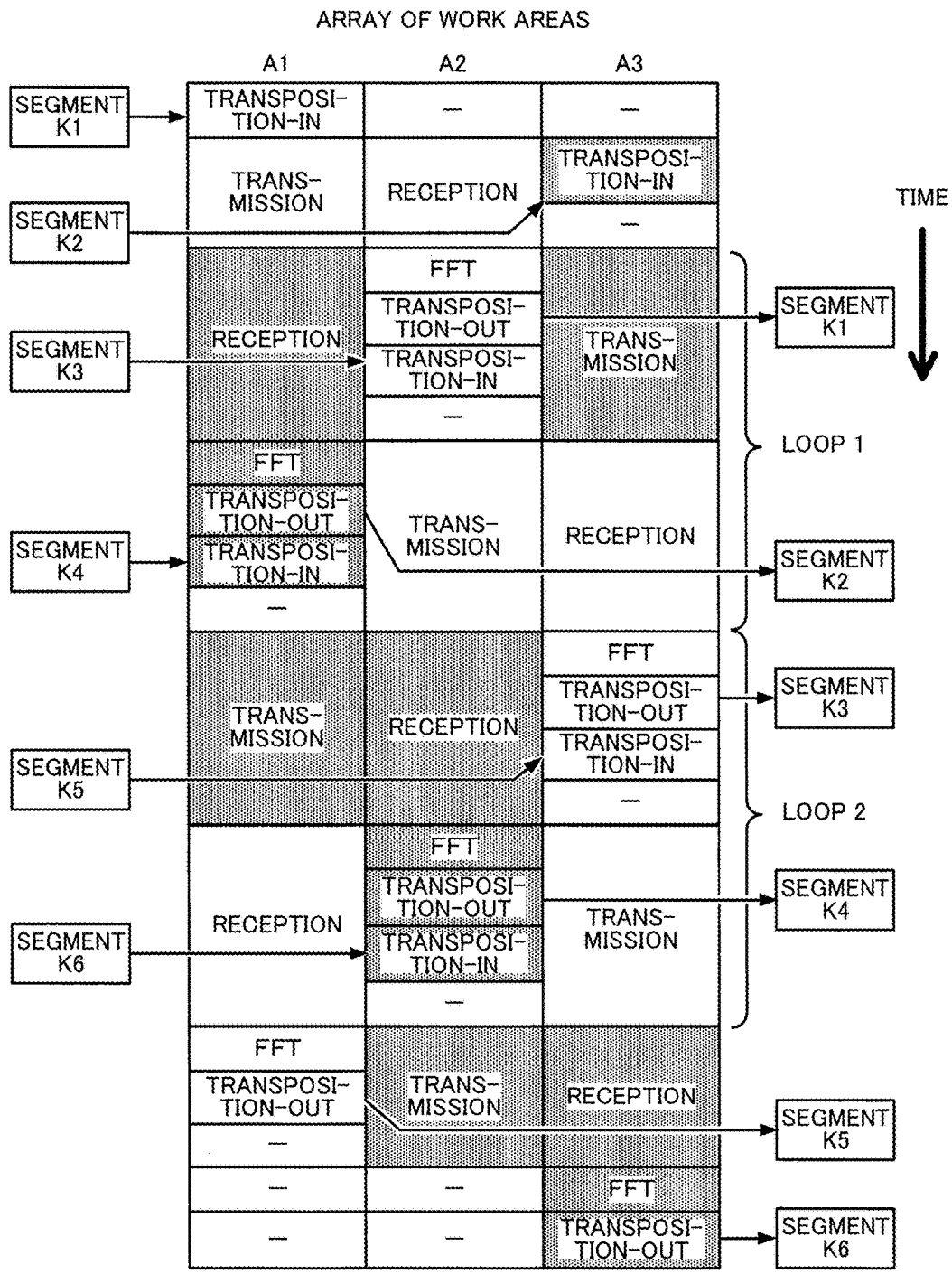
FIG. 29 illustrates an example of overlapping of an operation and a communication of a forward FFT operation according to the third embodiment.

FIG. 29 illustrates an example of overlapping of an operation and a communication in a forward FFT operation according to the third embodiment. A stream execution unit 170 provides three work areas A1 to A3 in a storage unit 150 for the two stream R1a and R2a. The stream execution unit 170 performs each of the two streams R1a and R2a by using the work areas A1 to A3 as follows. FIG. 29 illustrates an example in which a Z-direction forward FFT is performed on each of the data segments illustrated in FIG. 17. The passage of time is indicated by an arrow pointing down in FIG. 29. In FIG. 29, the processing corresponding to the stream R2a is indicated by shaded areas, and a hyphen "-" denotes a period in which no processing is performed by using the corresponding work area.

At timing 1, an input-output processing unit 171 extracts the segment K1 from the local array, performs transposition-in processing, and stores the transposed segment K1 in the work area A1.

At timing 2, a communication processing unit 172 performs an all-to-all communication by using the work area A1 (transmission buffer) and the work area A2 (reception buffer). In addition, at timing 2, an input-output processing unit 171a extracts the segment K2 from the local array, performs transposition-in processing, and stores the transposed segment K2 in the work area A3. The procedure indicated by timing 1 and timing 2 is the pre-processing performed before the following loop processing.

At timing 3, an FFT processing unit 173 performs an FFT operation on the data received through the all-to-all communication and stored in the work area A2. In addition, the input-output processing unit 171 performs transposition-out processing to transpose and store the FFT operation result, stored in the work area A2, in the corresponding original segment location in the local array. In addition, at timing 3, the input-output processing unit 171 extracts the segment K3 from the local array, performs transposition-in processing, and stores the transposed segment K3 in the work area A2. In addition, at timing 3, a communication processing unit 172a performs an all-to-all communication by using the work area A3 (transmission buffer) and the work area A1 (reception buffer).

At timing 4, the communication processing unit 172 performs an all-to-all communication by using the work area A2 (transmission buffer) and the work area A3 (reception buffer). In addition, at timing 4, an FFT processing unit 173a performs an FFT operation on the data received through the all-to-all communication and stored in the work area A1. In addition, the input-output processing unit 171a performs transposition-out processing to transpose and store the FFT operation result, stored in the work area A1, in the original segment location in the local array. In addition, the input-output processing unit 171a extracts the segment K4 from the local array, performs transposition-in processing, and stores the transposed segment K4 in the work area A1. The first loop (loop 1) of the loop processing is completed in accordance with the procedure indicated by timing 3 and timing 4.

At timing 5, the FFT processing unit 173 performs an FFT operation on the data received through the all-to-all communication and stored in the work area A3. In addition, the input-output processing unit 171 performs transposition-out processing to transpose and store the FFT operation result, stored in the work area A3, in the original segment location in the local array. In addition, the input-output processing unit 171 extracts the segment K5 from the local array, performs transposition-in processing, and stores the transposed segment K5 in the work area A3. In addition, at timing 5, the communication processing unit 172a performs an all-to-all communication by using the work area A1 (transmission buffer) and the work area A2 (reception buffer).

At timing 6, the communication processing unit 172 performs an all-to-all communication by using the work area A3 (transmission buffer) and the work area A1 (reception buffer). In addition, at timing 6, the FFT processing unit 173a performs an FFT operation on the data received through the all-to-all communication and stored in the work area A2. In addition, the input-output processing unit 171a performs transposition-out processing to transpose and store the FFT operation result, stored in the work area A2, in the original location in the local array. In addition, the input-output processing unit 171a extracts the segment K6 from the local array, performs transposition-in processing, and stores the transposed segment K6 in the work area A2. The second loop (loop 2) of the loop processing is completed in accordance with the procedure indicated by timing 5 and timing 6. Next, the loop termination procedure will be described.

At timing 7, the FFT processing unit 173 performs an FFT operation on the data received through the all-to-all communication and stored in the work area A1. In addition, the input-output processing unit 171 performs transposition-out processing to transpose and store the FFT operation result, stored in the work area A2, in the original segment location in the local array (completion of the stream R1a). In addition, at timing 7, the communication processing unit 172a performs an all-to-all communication by using the work area A2 (a transmission buffer) and the work area A3 (a reception buffer).

At timing 8, the FFT processing unit 173a performs an FFT operation on the data received through the all-to-all communication and stored in the work area A3.

At timing 9, the input-output processing unit 171a performs transposition-out processing to transpose and store the FFT operation result, stored in the work area A3, in the original location in the local array (completion of the stream R2a).

Next, a specific procedure of the forward FFT processing performed by using the above three work areas will be described. First, a procedure of overall forward FFT processing will be described.

Figure 30:
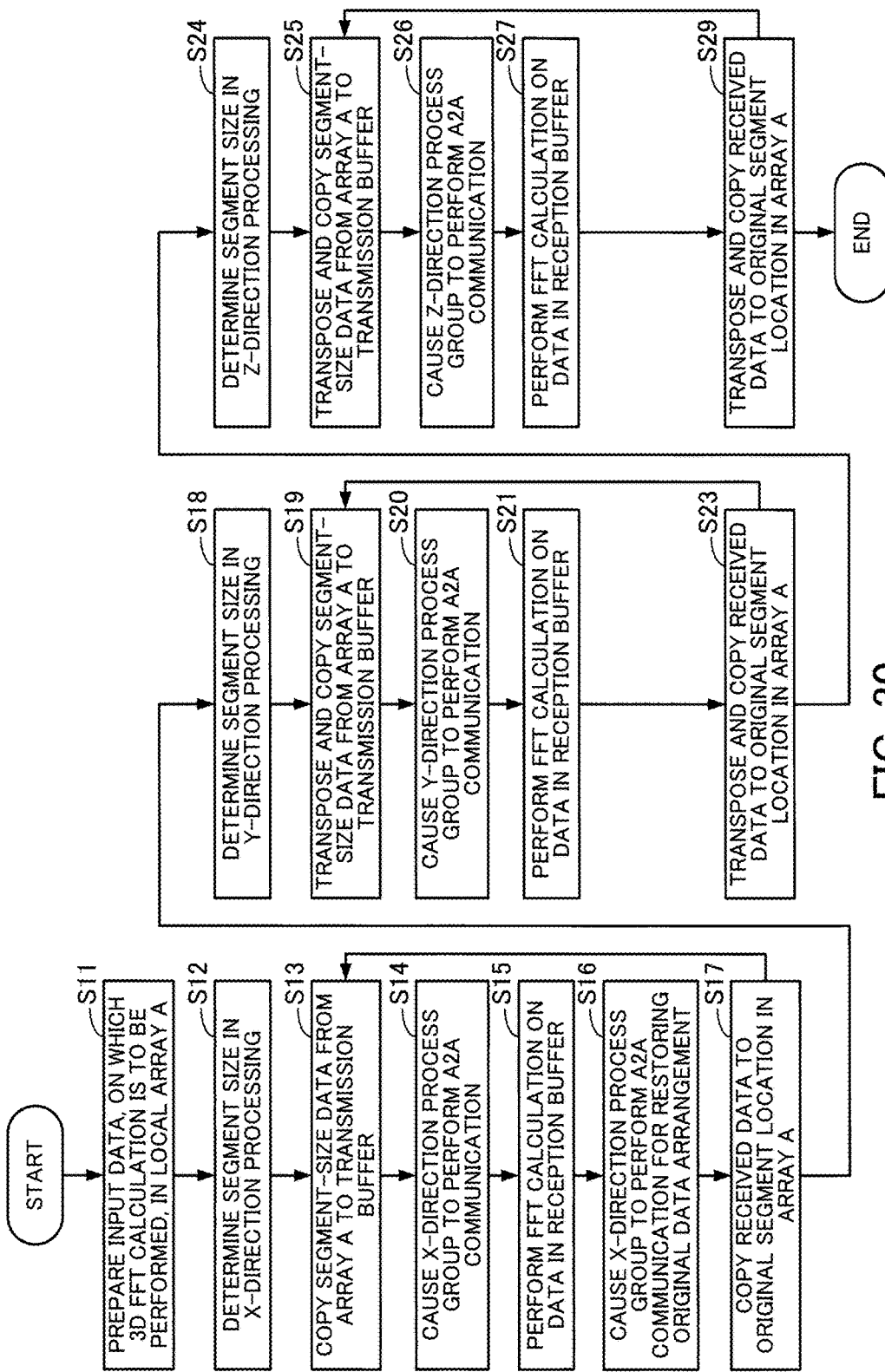
FIG. 30 is a flowchart illustrating an example of overall forward FFT processing according to the third embodiment.

FIG. 30 is a flowchart illustrating an example of overall forward FFT processing according to the third embodiment. The procedure in FIG. 30 is almost the same as the flowchart illustrating the overall FFT processing according to the second embodiment illustrated in FIG. 20. However, as described above, the flowchart in FIG. 30 is different from the flowchart in FIG. 20 in that the communication (steps S22 and S28 in FIG. 20) for restoring the original data arrangement is omitted. Namely, in the third embodiment, the stream execution unit 170 performs step S23 after performing step S21. In addition, the stream execution unit 170 performs step S29 after performing step S27. Because of the data dependency relationship of a 3D FFT algorithm, the communication for restoring the original data arrangement is not omitted for the X axis direction FFT calculation (the X direction can be processed in accordance with the same procedure as that according to the second embodiment). In addition, when the Y-direction FFT result is stored in the local array, a condition that the Z-direction data arrangement is not changed is added.

Next, an FFT calculation procedure in an individual axis direction of the overall forward FFT processing illustrated in FIG. 30 will be described. While the following description will be made with a focus on the Z direction, the Y-direction can also be processed in accordance with the same procedure as that in the Z direction.

Figure 31:
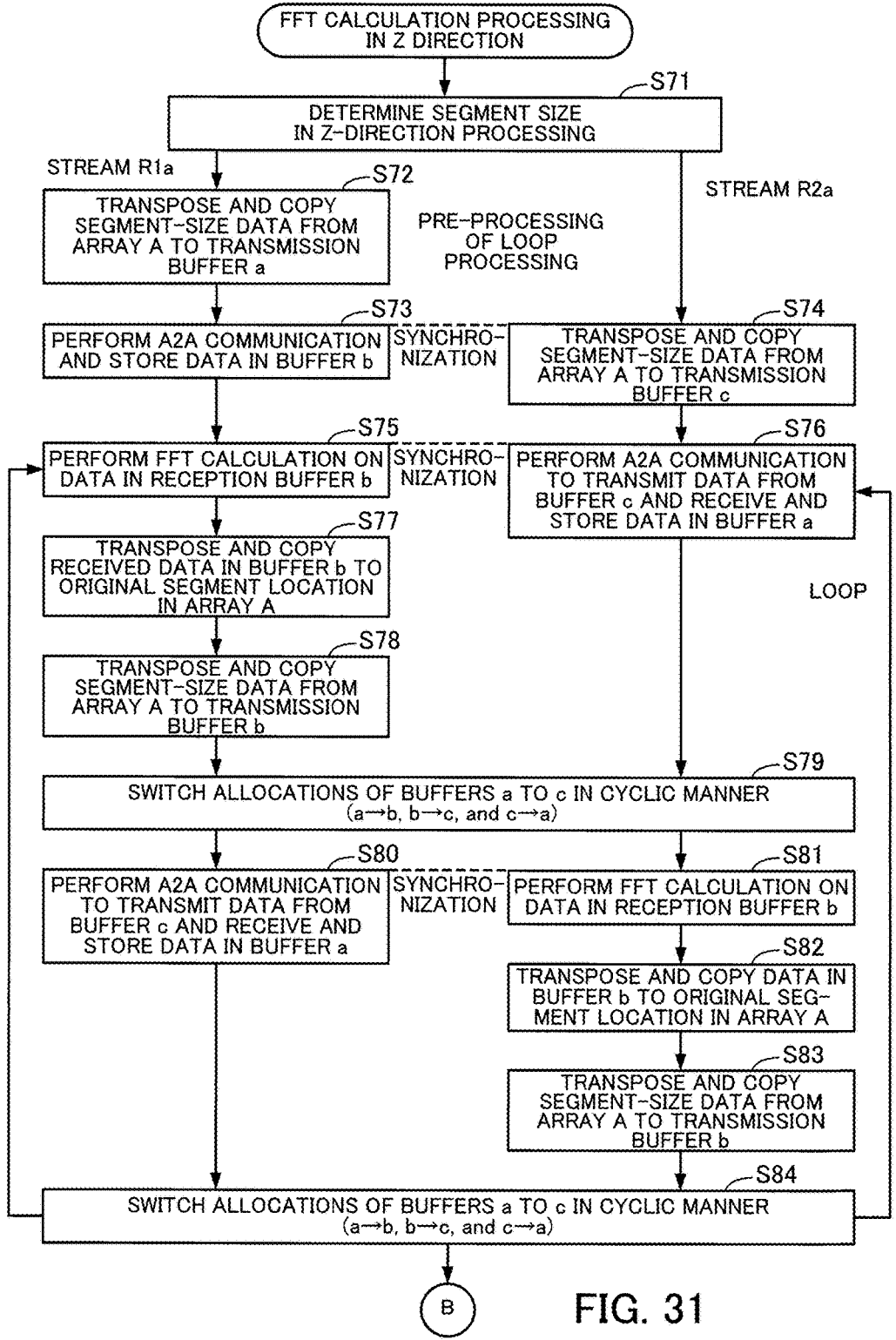
FIG. 31 is the first half of a flowchart illustrating an example of a Z-direction forward FFT operation according to the third embodiment.

FIG. 31 is the first half of a flowchart illustrating an example of a Z-direction forward FFT operation according to the third embodiment. Hereinafter, the processing illustrated in FIG. 31 will be described step by step. The following procedure corresponds to steps S24 to S29 in FIG. 30. The input-output processing unit 171, the communication processing unit 172, and the FFT processing unit 173 perform the processing in the stream R1a. The input-output processing unit 171a, the communication processing unit 172a, and the FFT processing unit 173a perform the processing in the stream R2a.

(S71) The control unit 160 determines a segment size in the Z-direction processing.

(S72) The input-output processing unit 171 transposes and copies segment-size data from the local array A to a transmission buffer a (transposition-in). Each of the work areas A1 to A3 is allocated to any one of buffers a, b, and c. In an initial state, the buffers a to c correspond to the work areas A1 to A3, respectively.

(S73) The communication processing unit 172 performs an all-to-all communication and receives and stores data in the buffer b.

(S74) The input-output processing unit 171a transposes and copies segment-size data from the local array A to the transmission buffer c (transposition-in). The communication processing unit 172 and the input-output processing unit 171a perform steps S73 and S74 in synchronization with each other. Steps S71 to S74 correspond to the pre-processing of the loop processing.

(S75) The FFT processing unit 173 performs an FFT calculation on the data in the reception buffer b.

(S76) The communication processing unit 172a performs an all-to-all communication to transmit the data from the buffer c and to receive and store data in the buffer a. The FFT processing unit 173 and the communication processing unit 172a perform steps S75 and S76 in synchronization with each other.

(S77) The input-output processing unit 171 transposes and copies the data in the buffer b to the original segment location in the local array A (transposition-out).

(S78) The input-output processing unit 171 transposes and copies segment-size data from the local array A to the transmission buffer b (transposition-in).

(S79) The input-output processing units 171 and 171a switches the allocations of the buffers a to c in a cyclic manner. Specifically, the work area corresponding to the buffer a is changed to serve as the buffer b. The work area corresponding to the buffer b is changed to serve as the buffer c. The work area corresponding to the buffer c is changed to serve as the buffer a.

(S80) The communication processing unit 172 performs an all-to-all communication to transmit the data from the buffer c and to receive and store data in the buffer a.

(S81) The FFT processing unit 173a performs an FFT calculation on the data in the reception buffer b. The communication processing unit 172 and the FFT processing unit 173a perform steps S80 and S81 in synchronization with each other.

(S82) The input-output processing unit 171a transposes and copies the data in the buffer b to the original segment location in the local array A (transposition-out).

(S83) The input-output processing unit 171a transposes and copies segment-size data from the local array A to the transmission buffer b (transposition-in).

(S84) The input-output processing units 171 and 171a switch the allocations of the buffers a to c in a cyclic manner. Specifically, the work area corresponding to the buffer a is changed to serve as the buffer b. The work area corresponding to the buffer b is changed to serve as the buffer c. The work area corresponding to the buffer c is changed to serve as the buffer a. The processing in the stream R1a returns to step S75 and the processing in the stream R2a returns to step S76 until all the data segments are processed. When all the data segments in the local array A are processed, the input-output processing unit 171 performs step S85.

Figure 32:
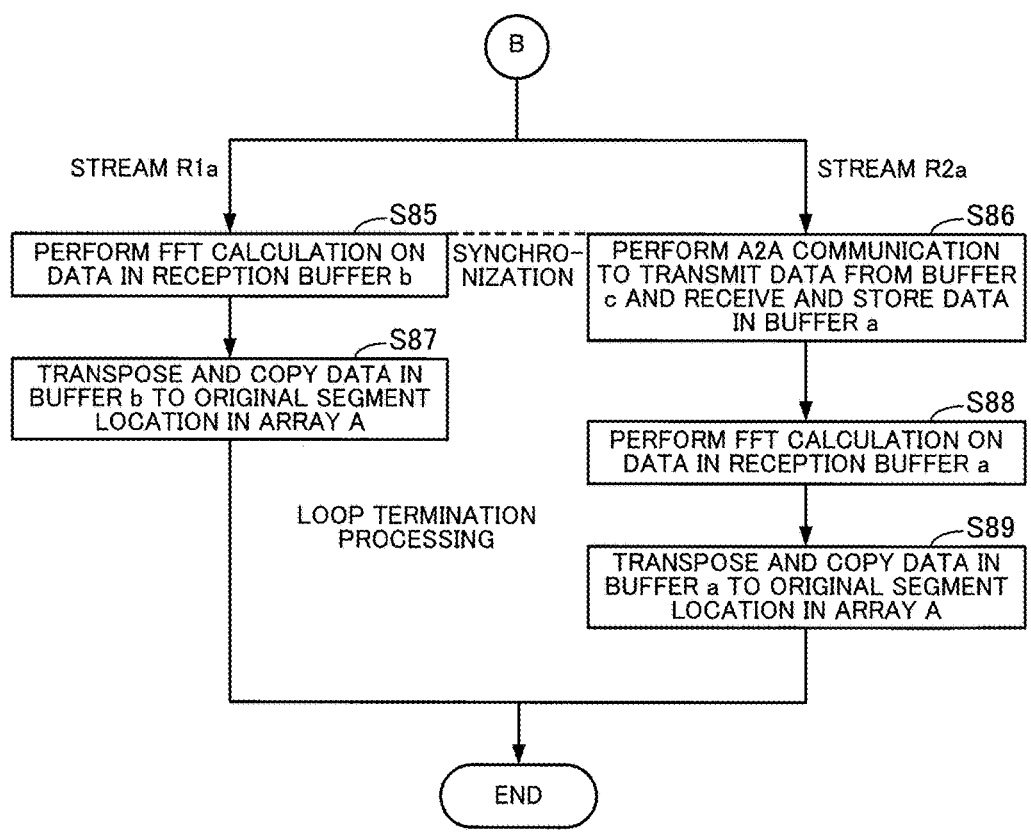
FIG. 32 is the second half of the flowchart illustrating an example of a Z-direction forward FFT operation according to the third embodiment.

FIG. 32 is the second half of the flowchart illustrating an example of a Z-direction forward FFT calculation according to the third embodiment. The processing illustrated in FIG. 32 will be described step by step.

(S85) The FFT processing unit 173 performs an FFT calculation on the data in the reception buffer b.

(S86) The communication processing unit 172a performs an all-to-all communication to transmit data from the buffer c and to receive and store data in the buffer a. The FFT processing unit 173 and the communication processing unit 172a perform steps S85 and S86 in synchronization with each other.

(S87) The input-output processing unit 171 transposes and copies the data in the buffer b to the original segment location in the local array A (transposition-out). Thus, the stream R1a is completed.

(S88) The FFT processing unit 173a performs an FFT calculation on the data in the reception buffer a.

(S89) The input-output processing unit 171a transposes and copies the data in the buffer a to the original segment location in the local array A (transposition-out). Thus, the stream R2a is completed. Steps S85 to S89 correspond to the loop termination processing. Thus, the Z-direction FFT calculation processing is completed.

Next, processing performed when an inverse FFT is performed will be described.

FIG. 33 illustrates an example of streams of an inverse FFT operation according to the third embodiment. The two streams when an inverse FFT is performed will be referred to as streams R1b and R2b. Each of the streams R1b and R2b sequentially performs transposition-in, FFT, transmission, reception, and transposition-out. Through the all-to-all communications performed after the inverse FFT calculations in the streams R1b and R2b, the original data arrangements prior to the forward FFT operations in the local array A are restored, respectively.

Figure 34:
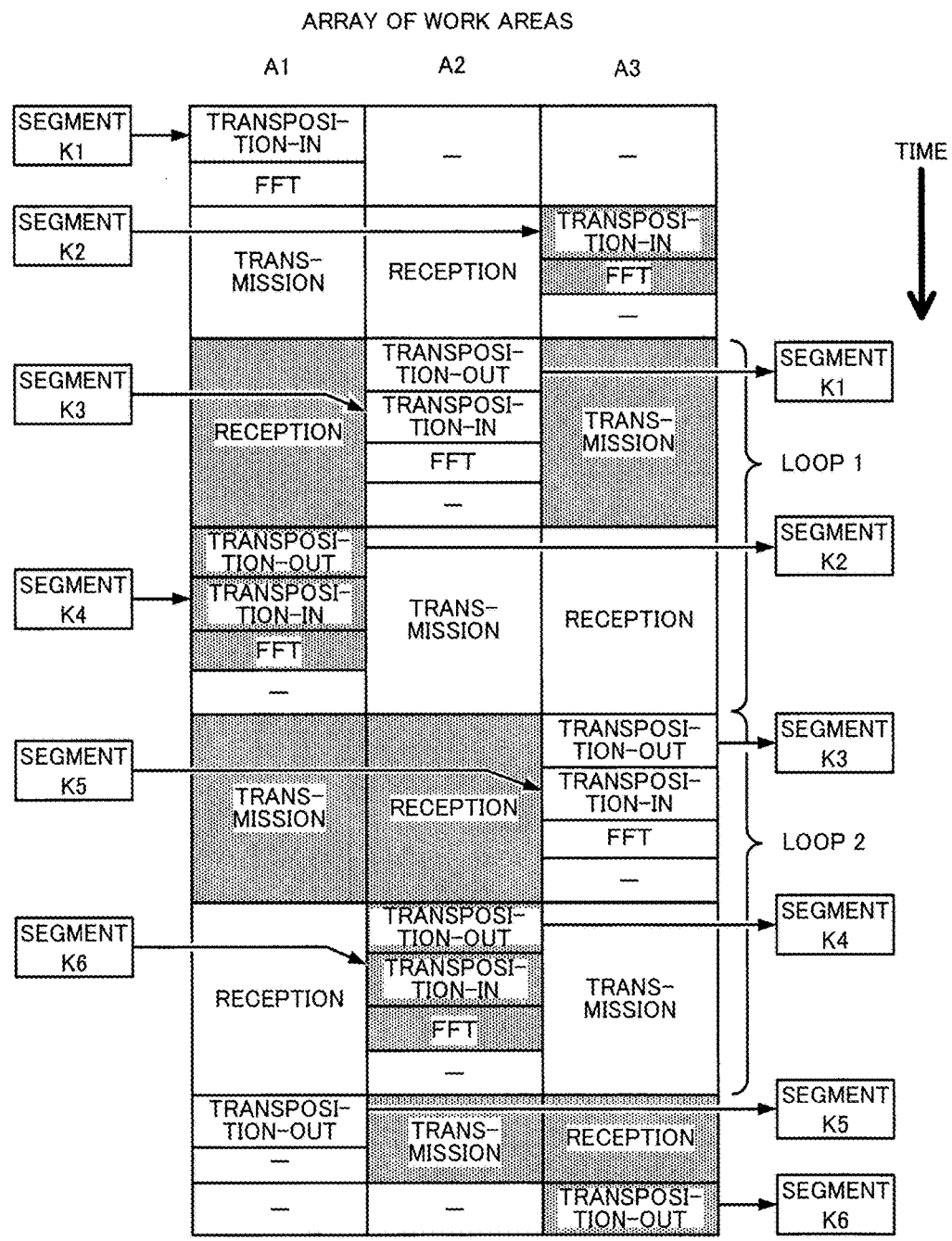
FIG. 34 illustrates an example of overlapping of an operation and a communication of an inverse FFT operation according to the third embodiment.

FIG. 34 illustrates an example of overlapping of an operation and a communication of an inverse FFT operation according to the third embodiment. The stream execution unit 170 provides the three work areas A1 to A3 in the storage unit 150 for the two streams R1b and R2b. The stream execution unit 170 performs each of the two streams R1b and R2b by using the work areas A1 to A3 as follows. FIG. 34 illustrates an example in which a Z-direction inverse FFT operation is performed on a local array in which the result obtained by performing the forward FFT operation in FIG. 29 on the data segments illustrated in FIG. 17 is stored. The passage of time is indicated by an arrow pointing down in FIG. 34. In FIG. 34, the processing corresponding to the stream R2b is indicated by shaded areas, and a hyphen "-" denotes a period in which no processing is performed by using the corresponding storage area.

At timing 1, the input-output processing unit 171 extracts the segment K1 from the local array, performs transposition-in processing, and stores the transposed segment K1 in the work area A1. In addition, the FFT processing unit 173 performs an FFT operation on the data stored in the work area A1.

At timing 2, the communication processing unit 172 performs an all-to-all communication of an individual FFT operation result by using the work area A1 (transmission buffer) and the work area A2 (reception buffer). In addition, at timing 2, the input-output processing unit 171a extracts the segment K2 from the local array, performs transposition-in processing, and stores the transposed segment K2 in the work area A3. In addition, the FFT processing unit 173a performs an FFT operation on the data stored in the work area A3. The procedure indicated by timing 1 and timing 2 is the pre-processing performed before the loop processing.

At timing 3, the input-output processing unit 171 performs transposition-out processing to transpose and store the result, received through the all-to-all communication and stored in the work area A2, in the original segment location of the local array. In addition, the input-output processing unit 171 extracts the segment K3 from the local array, performs transposition-in processing, and stores the transposed segment K3 in the work area A2. In addition, the FFT processing unit 173 performs an FFT operation on the data stored in the work area A2. In addition, at timing 3, the communication processing unit 172a performs an all-to-all communication of an individual FFT operation result by using the work area A3 (transmission buffer) and the work area A1 (reception buffer).

At timing 4, the communication processing unit 172 performs an all-to-all communication of an individual FFT operation result by using the work area A2 (transmission buffer) and the work area A3 (reception buffer). In addition, at timing 4, the input-output processing unit 171a performs transposition-out processing to transpose and store the result, received through the all-to-all communication and stored in the work area A1, in the original segment location of the local array. In addition, the input-output processing unit 171a extracts the segment K4 from the local array, performs transposition-in processing, and stores the transposed segment K4 in the work area A1. In addition, the FFT processing unit 173a performs an FFT operation on the data stored in the work area A1. The first loop processing is performed in accordance with the procedure indicated by timing 3 and timing 4.

At timing 5, the input-output processing unit 171 performs transposition-out processing to transpose and store the result, received through the all-to-all communication and stored in the work area A3, in the original segment location of the local array. In addition, the input-output processing unit 171 extracts the segment K5 from the local array, performs transposition-in processing, and stores the transposed segment K5 in the work area A3. In addition, the FFT processing unit 173 performs an FFT operation on the data stored in the work area A3. In addition, at timing 5, the communication processing unit 172a performs an all-to-all communication of an individual FFT operation result by using the work area A1 (transmission buffer) and the work area A2 (reception buffer).

At timing 6, the communication processing unit 172 performs an all-to-all communication of an individual FFT operation result by using the work area A3 (transmission buffer) and the work area A1 (reception buffer). In addition, at timing 6, the input-output processing unit 171a performs transposition-out processing to transpose and store the result, received through the all-to-all communication and stored in the work area A2, in the original segment location of the local array. In addition, the input-output processing unit 171a extracts the segment K6 from the local array, performs transposition-in processing, and stores the transposed segment K6 in the work area A2. In addition, the FFT processing unit 173a performs an FFT operation on the data stored in the work area A2. The second loop processing is completed in accordance with the procedure indicated by timing 5 and timing 6. Next, the loop termination processing will be described.

At timing 7, the input-output processing unit 171 performs transposition-out processing to transpose and store the result, received through the all-to-all communication and stored in the work area A1, in the original segment location of the local array (completion of the stream R1b). In addition, at timing 7, the communication processing unit 172a performs an all-to-all communication of an individual FFT operation result by using the work area A2 (transmission buffer) and the work area A3 (reception buffer).

At timing 8, the input-output processing unit 171a performs transposition-out processing to transpose and store the result, received through the all-to-all communication and stored in the work area A3, in the original segment location of the local array (completion of the stream R2b).

Next, a specific procedure of the inverse FFT processing performed by using the above three work areas will be described. First, a procedure of overall inverse FFT processing will be described.

Figure 35:
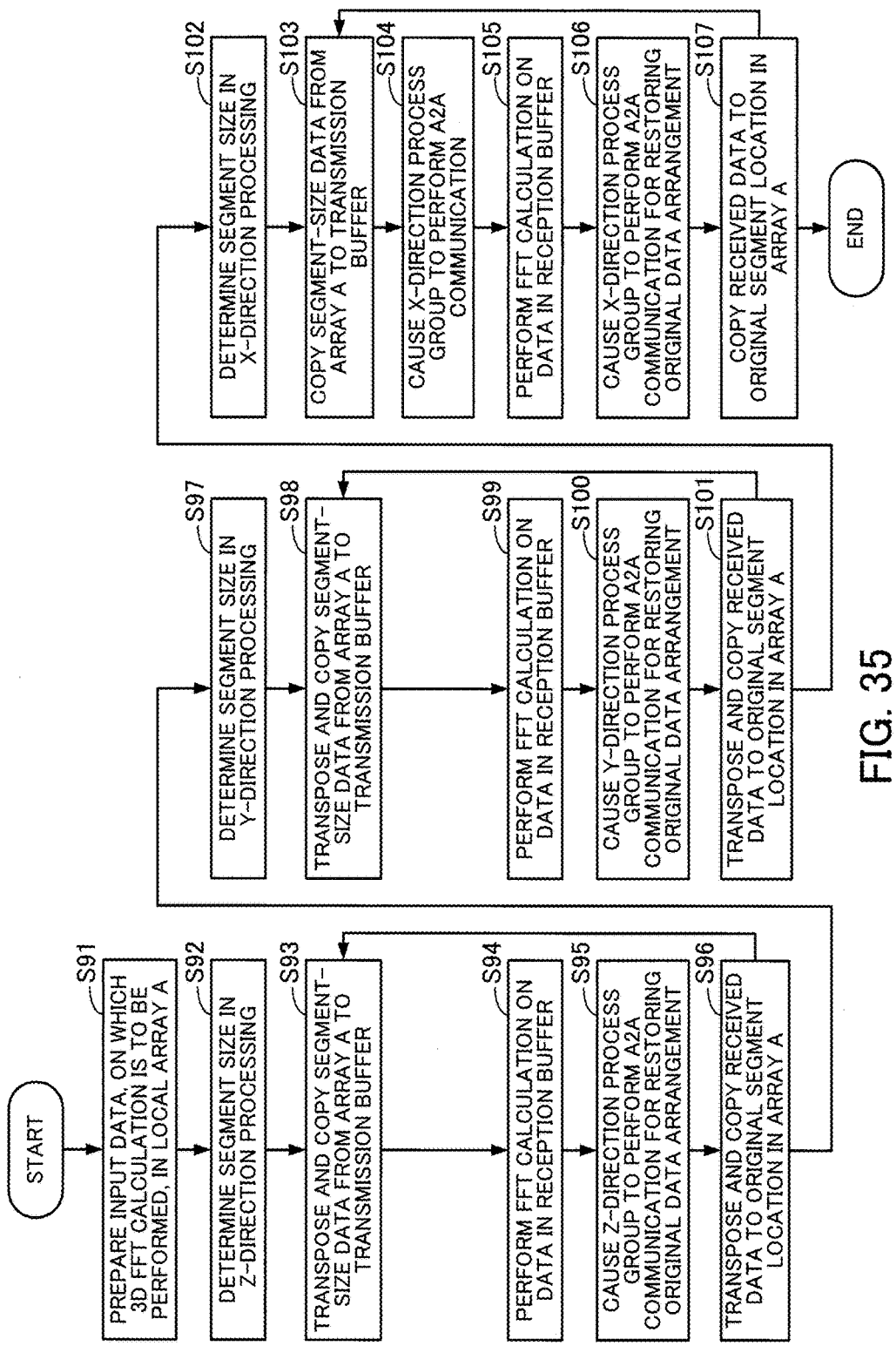
FIG. 35 is a flowchart illustrating an example of overall inverse FFT processing according to the third embodiment.

FIG. 35 is a flowchart illustrating an example of overall inverse FFT processing according to the third embodiment. Hereinafter, the processing illustrated in FIG. 35 will be described step by step.

(S91) The control unit 160 prepares input data, on which a 3D FFT calculation is to be performed, in a local array A.

(S92) The control unit 160 determines a segment size in the Z-direction processing. The same segment size determination method according to the second embodiment illustrated in FIG. 26 may be used in this step.

(S93) The stream execution unit 170 transposes and copies segment-size data from the local array A to a transmission buffer (transposition-in).

(S94) The stream execution unit 170 performs an inverse FFT calculation on the data in the reception buffer.

(S95) The stream execution unit 170 causes the Z-direction process group to perform an all-to-all communication for restoring the original data arrangement.

(S96) The stream execution unit 170 transposes and copies the received data to the original segment location in the local array A (transposition-out). The stream execution unit 170 repeats the procedure indicated by steps S93 to S96 by using the two streams as illustrated in FIG. 34. Next, after performing the Z-direction FFT processing, the calculation node 100 performs step S97.

(S97) The control unit 160 determines a segment size in the Y-direction processing.

(S98) The stream execution unit 170 transposes and copies segment-size data from the local array A to a transmission buffer (transposition-in).

(S99) The stream execution unit 170 performs an FFT calculation on the data in the reception buffer.

(S100) The stream execution unit 170 causes the Y-direction process group to perform an all-to-all communication for restoring the original data arrangement.

(S101) The stream execution unit 170 transposes and copies the received data to the original segment location in the local array A (transposition-out). The stream execution unit 170 repeats the procedure indicated by steps S98 to S101 by using the two streams as illustrated in FIG. 34. Next, after performing the Y-direction FFT processing, the calculation node 100 performs step S102.

(S102) The control unit 160 determines a segment size in the X-direction processing.

(S103) The stream execution unit 170 copies segment-size data from the local array A to a transmission buffer.

(S104) The stream execution unit 170 causes an X-direction process group to perform an all-to-all communication.

(S105) The stream execution unit 170 performs an FFT calculation on the data in the reception buffer.

(S106) The stream execution unit 170 causes the X-direction process group to perform an all-to-all communication for restoring the original data arrangement.

(S107) The stream execution unit 170 copies the received data to the original segment location in the local array A. The stream execution unit 170 repeats the procedure indicated by steps S103 to S107 by using the two streams as illustrated in FIG. 19. Next, after performing the X-direction FFT processing, the calculation node 100 ends the present processing.

Next, a procedure of an FFT calculation in an individual axis direction in the overall inverse FFT processing illustrated in FIG. 35 will be described. While the following description will be made with a focus on the Z direction, like processing may be performed in the Y direction.

Figure 36:
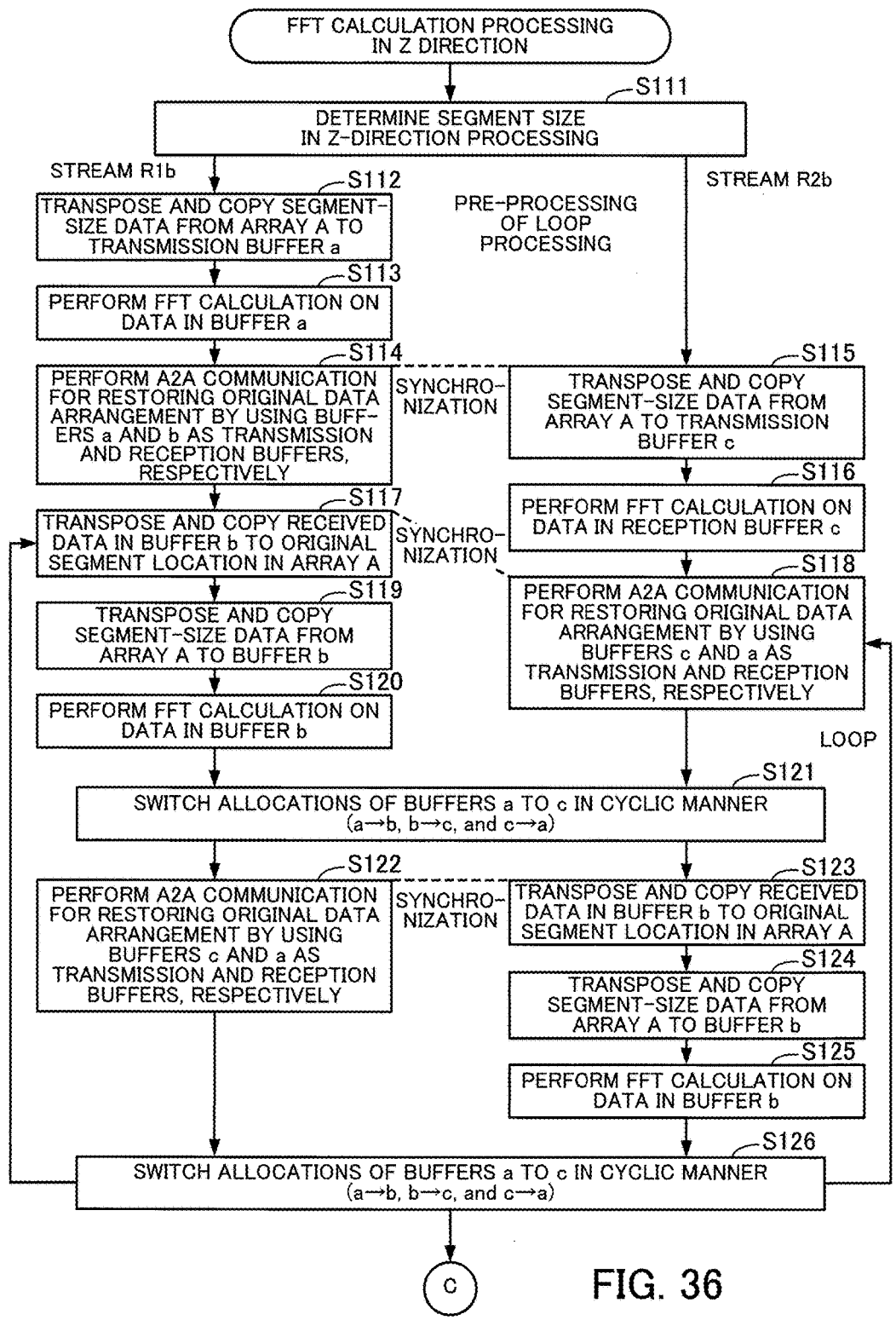
FIG. 36 is the first half of a flowchart illustrating an example of a Z-direction inverse FFT operation according to the third embodiment.

FIG. 36 is a flowchart illustrating an example of a Z-direction inverse FFT according to the third embodiment. The processing illustrated in FIG. 36 will be described step by step. The following procedure corresponds to steps S92 to S96 in FIG. 35. The input-output processing unit 171, the communication processing unit 172, and the FFT processing unit 173 perform the processing in the stream R1b. The input-output processing unit 171a, the communication processing unit 172a, and the FFT processing unit 173a perform the processing in the stream R2b.

(S111) The control unit 160 determines a segment size in the Z-direction processing.

(S112) The input-output processing unit 171 transposes and copies segment-size data from the local array A to a transmission buffer a (transposition-in). Each of the work areas A1 to A3 is allocated to any one of buffers a, b, and c. In an initial state, the buffers a to c correspond to the work areas A1 to A3, respectively.

(S113) The FFT processing unit 173 performs an FFT calculation on the data in the reception buffer a.

(S114) The communication processing unit 172 performs an all-to-all communication to transmit the data from the buffer a and to receive and store data in the buffer b, to restore the original data arrangement.

(S115) The input-output processing unit 171a transposes and copies segment-size data from the local array A to the transmission buffer c (transposition-in). The communication processing unit 172 and the input-output processing unit 171a performs steps S114 and S115 in synchronization with each other.

(S116) The FFT processing unit 173a performs an FFT calculation on the data in the buffer c.

(S117) The input-output processing unit 171 transposes and copies the received data in the buffer b to the original segment location in the local array A (transposition-out).

(S118) The communication processing unit 172a performs an all-to-all communication to transmit the data from the buffer c and receive and store data in the buffer a, to restore the original data arrangement. The input-output processing unit 171 and the communication processing unit 172a performs steps S117 and S118 in synchronization with each other.

(S119) The input-output processing unit 171 transposes and copies segment-size data from the local array A to a buffer b (transposition-in).

(S120) The FFT processing unit 173 performs an FFT calculation on the data in the reception buffer b.

(S121) The input-output processing units 171 and 171a switch the allocations of the buffers a to c in a cyclic manner. Specifically, the work area corresponding to the buffer a is changed to serve as the buffer b. The work area corresponding to the buffer b is changed to serve as the buffer c. The work area corresponding to the buffer c is changed to serve as the buffer a.

(S122) The communication processing unit 172 performs an all-to-all communication to transmit the data from the buffer c and receive and store data in the buffer a, to restore the original data arrangement.

(S123) The input-output processing unit 171a transposes and copies the received data in the buffer b to the original segment location in the local array A (transposition-out). The communication processing unit 172 and the input-output processing unit 171a perform steps S122 and S123 in synchronization with each other.

(S124) The input-output processing unit 171a transposes and copies segment-size data from the local array A to a buffer b (transposition-in).

(S125) The FFT processing unit 173a performs an FFT calculation on the data in the buffer b.

(S126) The input-output processing units 171 and 171a switch the allocations of the buffers a to c in a cyclic manner. Specifically, the work area corresponding to the buffer a is changed to serve as the buffer b. The work area corresponding to the buffer b is changed to serve as the buffer c. The work area corresponding to the buffer c is changed to serve as the buffer a. The processing in the stream R1b returns to step S117 and the processing in the stream R2b returns to step S118 until all the data segments are processed. When all the data segments in the local array A are processed, the input-output processing unit 171 performs step S127.

Figure 37:
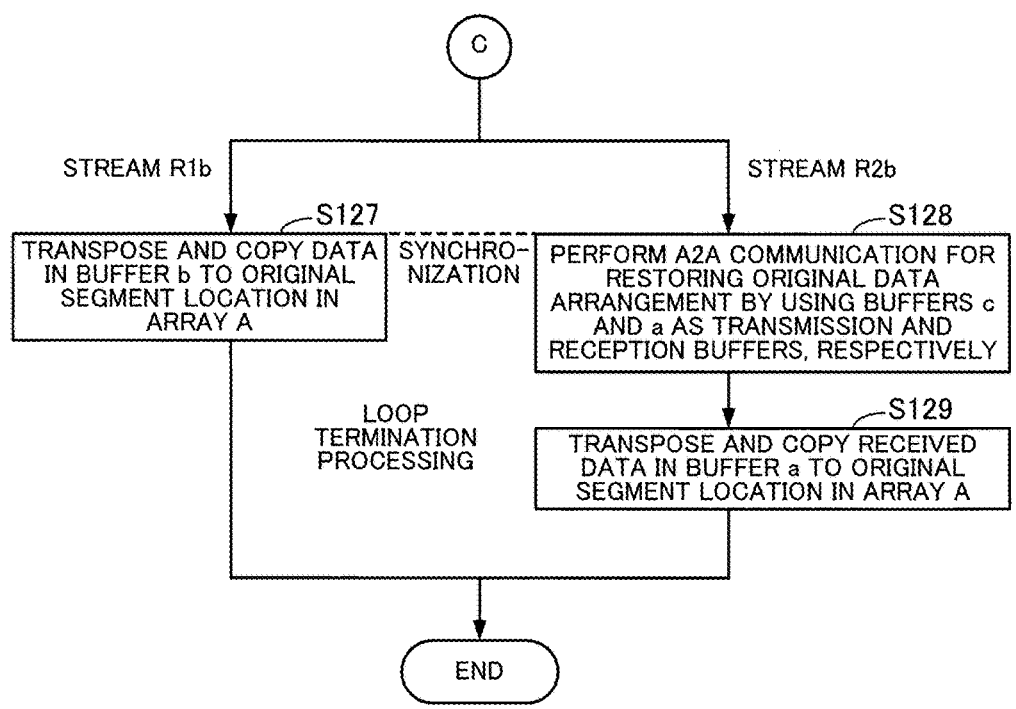
FIG. 37 is the second half of the flowchart illustrating an example of a Z-direction inverse FFT operation according to the third embodiment.

FIG. 37 is the second half of the flowchart illustrating an example of a Z-direction inverse FFT operation according to the third embodiment. The processing illustrated in FIG. 37 will be described step by step.

(S127) The input-output processing unit 171 transposes and copies the received data in the buffer b to the original segment location in the local array A (transposition-out). Thus, the stream R1b is completed.

(S128) The communication processing unit 172a performs an all-to-all communication to transmit the data from the buffer c and receive and store data in the buffer a, to restore the original data arrangement.

(S129) The input-output processing unit 171a transposes and copies the received data in the buffer a to the original segment location in the local array A (transposition-out). Thus, the stream R2b is completed. Steps S127 to S129 correspond to the loop termination processing. In this way, the Z-direction inverse FFT calculation processing is completed.

Thus, as in the second embodiment, the parallel computer according to the third embodiment also achieves parallel processing of a communication and an operation while preventing a conflict of a buffer used between the two streams, by using the three work areas A1 to A3.

As a result, as in the second embodiment, the parallel computer according to the third embodiment achieves reduction of the memory used as an array of work areas and has an improved cache use efficiency. Consequently, the parallel computer is able to perform a faster FFT calculation.

The information processing according to the first embodiment may be realized by causing the operation unit 12 to perform a program. In addition, the information processing according to the second or third embodiment may be realized by causing the CPUs 110 and 120 to perform a program. Any one of the programs may be recorded in a computer-readable storage medium 33. Each of the calculation nodes 100, 100a, 100b, 100c, etc. may be deemed to be a computer including a memory and a processor.

For example, any one of the programs may be made available by distributing a storage medium 33 in which the programs is recorded. Alternatively, any one of the programs may be stored in advance in another computer (for example, the data storage server 300), and the program may be distributed via a network. For example, a computer may store (install) any one of the programs, recorded in a storage medium 33 or received from another computer, in a storage device such as the RAM 130, read the program from the storage device, and execute the program.

In one aspect, a faster FFT operation is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A parallel computer comprising a plurality of nodes each including:
 a memory configured to include a first storage area, a second storage area, and a third storage area; and
 a processor configured to concurrently execute a first process and a second process,
 in a first time period, the first process performs a first FFT (Fast Fourier Transform) operation by using the first storage area,
 in a second time period that precedes the first time period, the second process performs a second FFT operation by using the second storage area,
 in the first time period, the second process transmits a result of the second FFT operation stored in the second storage area to other processes executed in other nodes among the plurality of nodes, receives results of FFT operations from said other processes executed in the other nodes, and stores the received results of FFT operations in the third storage area, and
 in the second time period, the first process transmits input data stored in the third storage area to said other processes executed in the other nodes, receives input data from said other processes executed in the other nodes, and stores the received input data in the first storage area.

2. The parallel computer according to claim 1, wherein, when the first process extracts data from a predetermined array and stores the extracted data in one of the first to third storage areas, or when the first process outputs data from said one of the first to third storage areas back to the array, the second process performs a collective communication with said other processes by using remaining two storage areas.

3. The parallel computer according to claim 1, wherein the processor determines a message length of an inter-process communication, based on a capacity of a cache memory usable as the memory, and determines a size of data processed by each of a plurality of processes, based on the determined message length.

4. The parallel computer according to claim 3, wherein the processor determines the message length, based on a bisection bandwidth of communication paths among the plurality of nodes on which a plurality of processes operate to perform a collective communication.

5. The parallel computer according to claim 4, wherein the processor selects a calculation expression for obtaining the bisection bandwidth, based on whether a uniaxial, biaxial, or triaxial distribution is used.

6. A non-transitory computer-readable storage medium storing an FFT (Fast Fourier Transform) operation program that causes a parallel computer formed from a plurality of nodes each including a processor and a memory coupled thereto, wherein the FFT operation program causes the processor in each node to concurrently execute a first process and a second process, the first process comprises:
 performing, in a first time period, a first FFT operation by using a first storage area in the memory,
 transmitting, in a second time period that precedes the first time period, input data stored in a third storage area in the memory to other processes executed in other nodes among the plurality of nodes, and
 receiving, in the second time period, input data from said other processes executed in the other nodes and storing the received input data in the first storage area; and
the second process comprises:
 performing, in the second time period, a second FFT operation by using a second storage area in the memory,
 transmitting, in the first time period, a result of the second FFT operation stored in the second storage area in the memory to said other processes executed in the other nodes, and
 receiving, in the first time period, results of FFT operations from said other processes executed in the other nodes and storing the received results of FFT operations in the third storage area in the memory.

7. An FFT (Fast Fourier Transform) operation method of a parallel computer formed from a plurality of nodes each including a processor and a memory coupled thereto, the FFT operation method comprising:
- concurrently executing, by the processor in each node of the parallel computer, a first process and a second process;
- performing, by the first process in a first time period, a first FFT operation by using a first storage area in the memory;
- performing, by the second process in a second time period that precedes the first time period, a second FFT operation by using a second storage area in the memory;
- transmitting, by the second process in the first time period, a result of the second FFT operation stored in the second storage area in the memory to other processes executed in other nodes among the plurality of nodes;
- receiving, by the first process in the second time period, results of FFT operations from said other processes executed in the other nodes, and storing the received results in a third storage area in the memory;
- transmitting, by the first process in the second time period, input data stored in the third storage area to said other processes executed in the other nodes; and
- receiving, by the first process in the second time period, input data from said other processes executed in the other nodes, and storing the received input data in the first storage area in the memory.

* * * * *